(12) United States Patent
Kamiya

(10) Patent No.: US 11,409,481 B2
(45) Date of Patent: Aug. 9, 2022

(54) SETTING SYSTEM, CONTROL METHOD, AND STORAGE MEDIUM

(71) Applicant: CANON KABUSHIKI KAISHA, Tokyo (JP)

(72) Inventor: Yuka Kamiya, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/744,054

(22) Filed: Jan. 15, 2020

(65) Prior Publication Data

US 2020/0233616 A1 Jul. 23, 2020

(30) Foreign Application Priority Data

Jan. 22, 2019 (JP) .............................. JP2019-008714

(51) Int. Cl.
*G06F 3/12* (2006.01)

(52) U.S. Cl.
CPC ............ *G06F 3/123* (2013.01); *G06F 3/1203* (2013.01); *G06F 3/1225* (2013.01); *G06F 3/12* (2013.01); *G06F 3/1204* (2013.01)

(58) Field of Classification Search
CPC ...... G06F 3/123; G06F 3/1225; G06F 3/1203; G06F 3/1288; G06F 3/1204; G06F 3/12; H04N 1/00204; H04N 2201/0094; H04N 1/00962; H04N 1/00938

USPC ........................................................ 358/1.15
See application file for complete search history.

(56) References Cited

U.S. PATENT DOCUMENTS

| | | | | |
|---|---|---|---|---|
| 9,389,991 | B1* | 7/2016 | Molner | G06F 11/3466 |
| 10,140,421 | B1* | 11/2018 | Bernard | A61B 5/0022 |
| 2004/0148379 | A1* | 7/2004 | Ogura | H04L 67/2871 709/223 |
| 2007/0192155 | A1* | 8/2007 | Gauger | G06Q 10/103 705/301 |
| 2011/0093845 | A1* | 4/2011 | Kwak | G06F 8/60 717/173 |
| 2014/0372997 | A1* | 12/2014 | Furushige | G06F 8/658 717/168 |
| 2015/0131123 | A1* | 5/2015 | Uchida | H04N 1/00464 358/1.15 |

FOREIGN PATENT DOCUMENTS

JP  2015205499 A  11/2015

* cited by examiner

*Primary Examiner* — Darryl V Dottin
(74) *Attorney, Agent, or Firm* — Canon U.S.A., Inc. IP Division

(57) ABSTRACT

An image forming apparatus includes an acquisition unit to identify firmware to be set to the image forming apparatus based on an instruction generated by a generation unit, and acquire the identified firmware from a server.

4 Claims, 22 Drawing Sheets

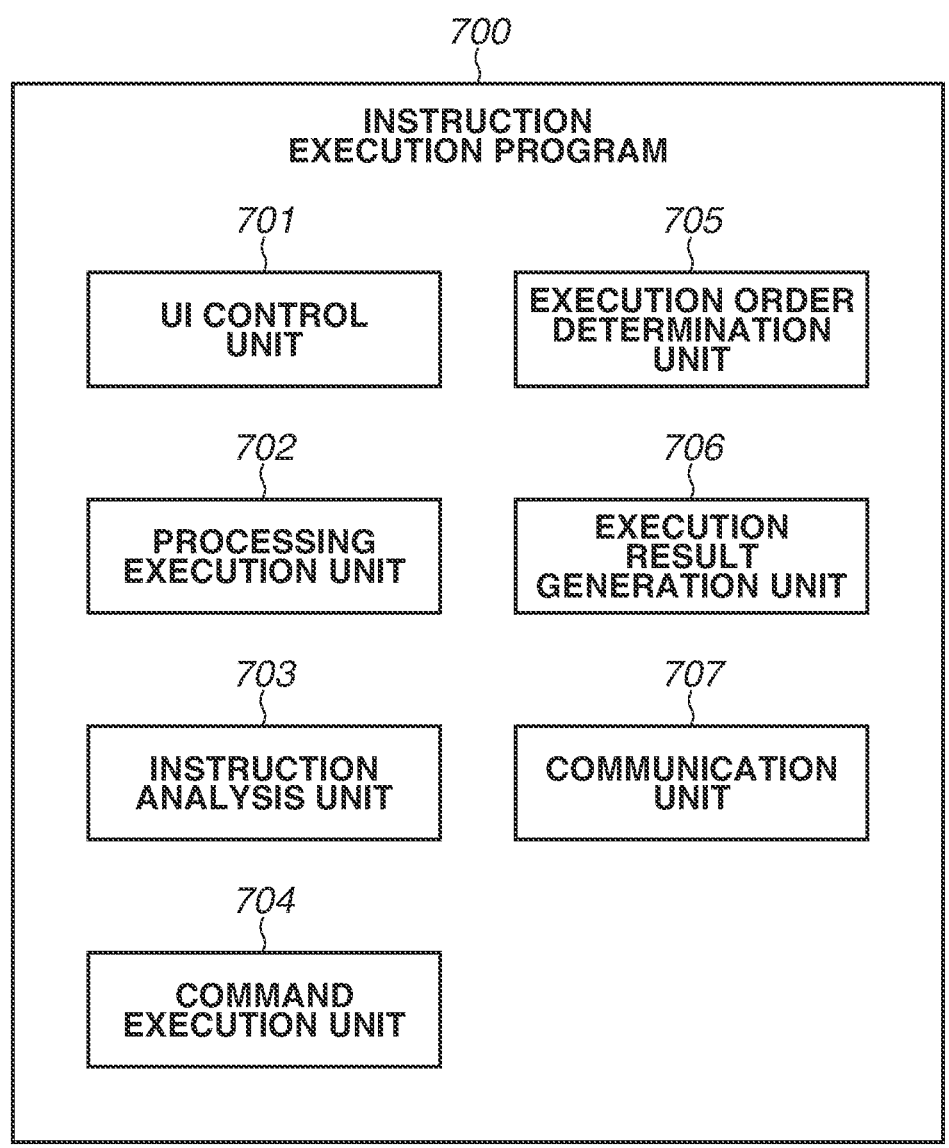

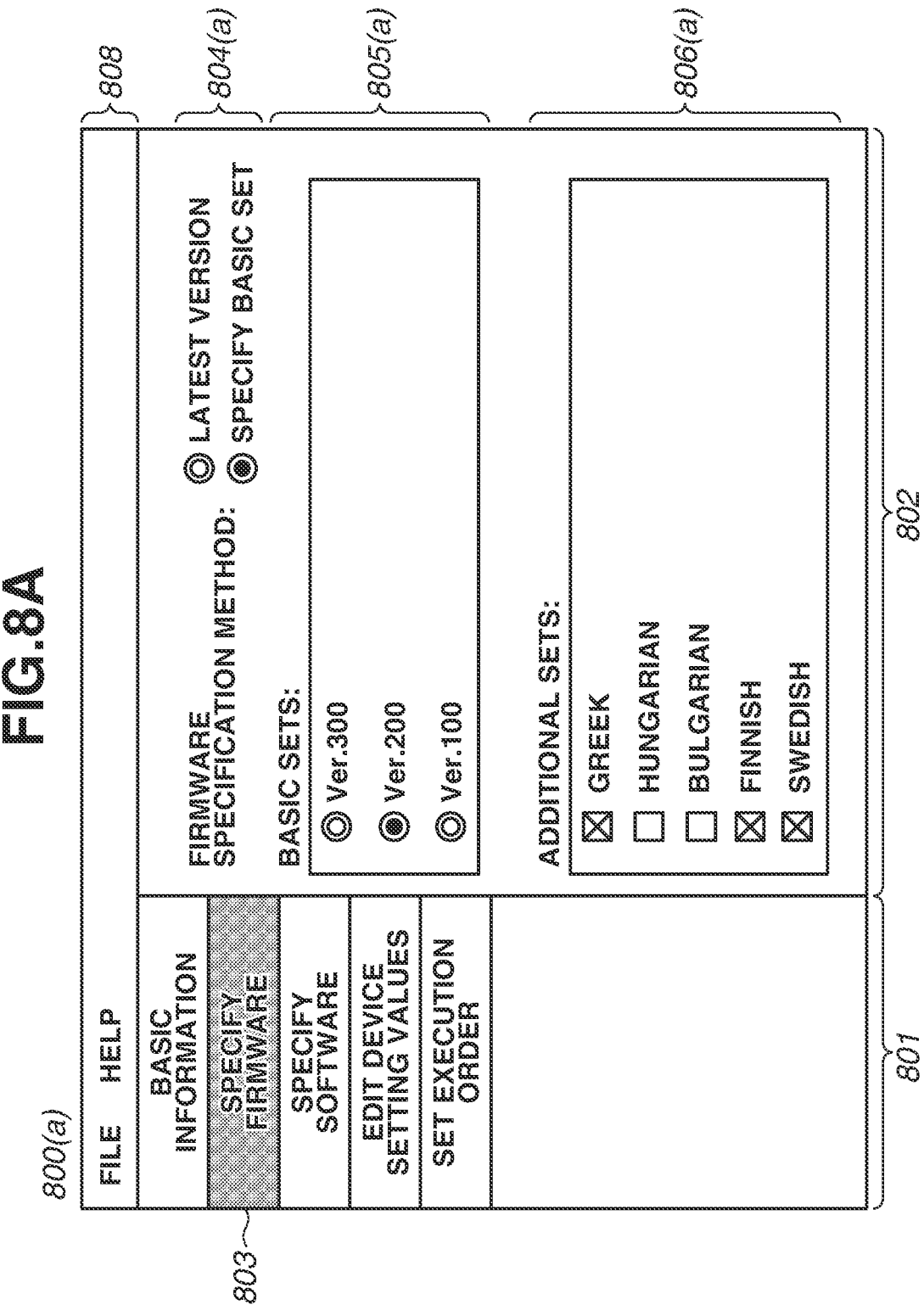

COMBINATION LIST:

| NUMBER OF ADDITIONAL SETS | COMBINATION |
|---|---|
| 5 | GREEK/HUNGARIAN/BULGARIAN/FINNISH/SWEDISH |
| 3 | BULGARIAN/FINNISH/SWEDISH |
| 2 | GREEK/FINNISH |

901

902

ADDITIONAL SETS:

☒ GREEK
☐ HUNGARIAN
☐ BULGARIAN
☒ FINNISH
☒ SWEDISH

☒ ADD NEW ADDITIONAL SET AT TIME OF EXECUTION
904

OK   CANCEL
903

FIG.13

```
<?xml version="1.0" encodeing="utf-8" ?>
<Script xmlns:xsl="http://www.XXX.com/XMLSchema">

<scriptSummary>
        <deviceid></deviceid>
        <create>20181220134528</create>
        <scriptid>0123456789</scriptid>
        <sctiptName>script</scriptName>
    </scriptSummary>

<commands>

<updateFirmwareCommand order="1">
            <selectType>latest</selectType>

<firmwareId></firmwareId>
            <firmwareName></firmwareName >

<additionalSw>ON</additionalSw>

<addSet>
                <addSetId></addSetId>
                <addSetName>GREEK</addSetName>
            </addSet >
            <addSet>
                <addSetId></addSetId>
                <addSetName>FINNISH</addSetName>
            </addSet>
            <addSet>
                <addSetId></addSetId>
                <addSetName>SWEDISH</addSetName>
            </addSet>
        </updateFirmwareCommand>

</commands>
</Script>
```

1300, 1301, 1302, 1303, 1304, 1305

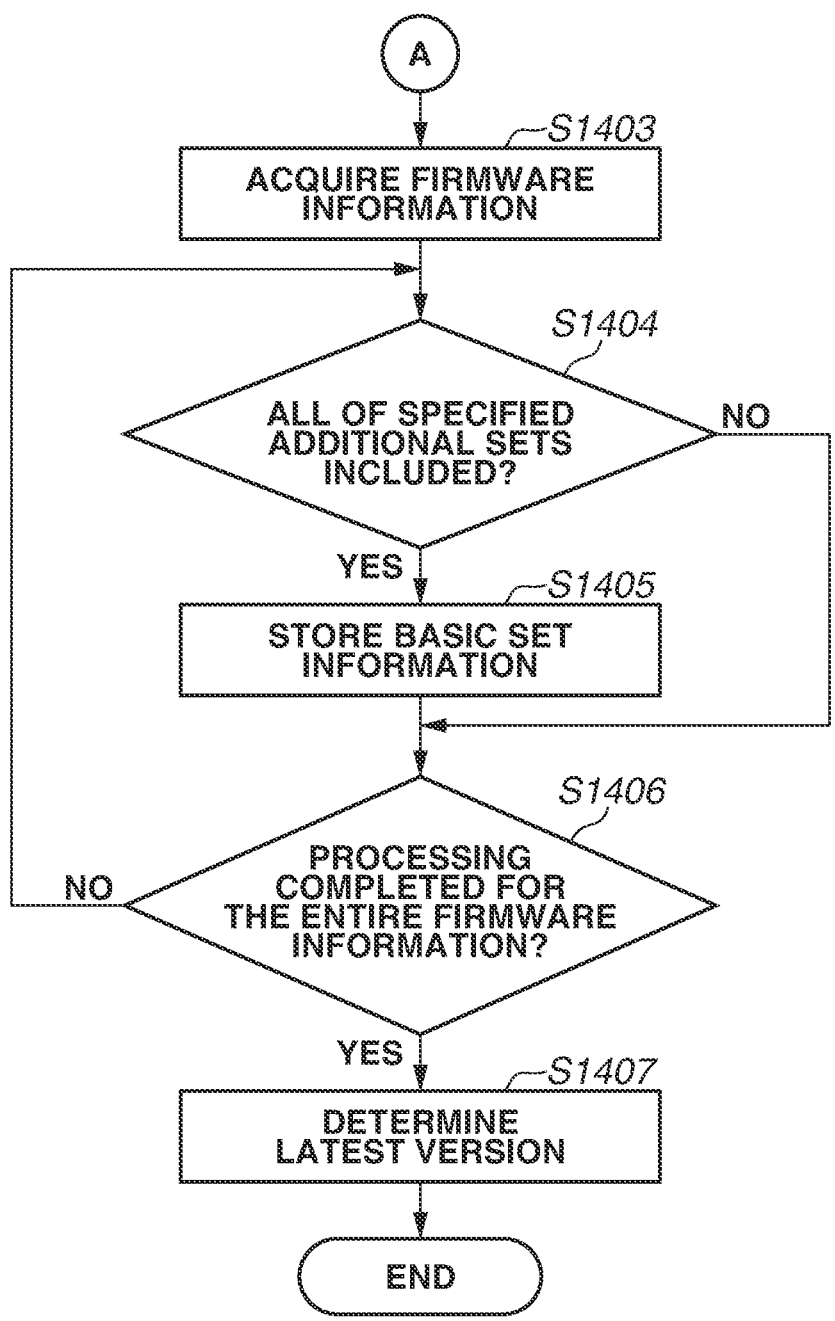

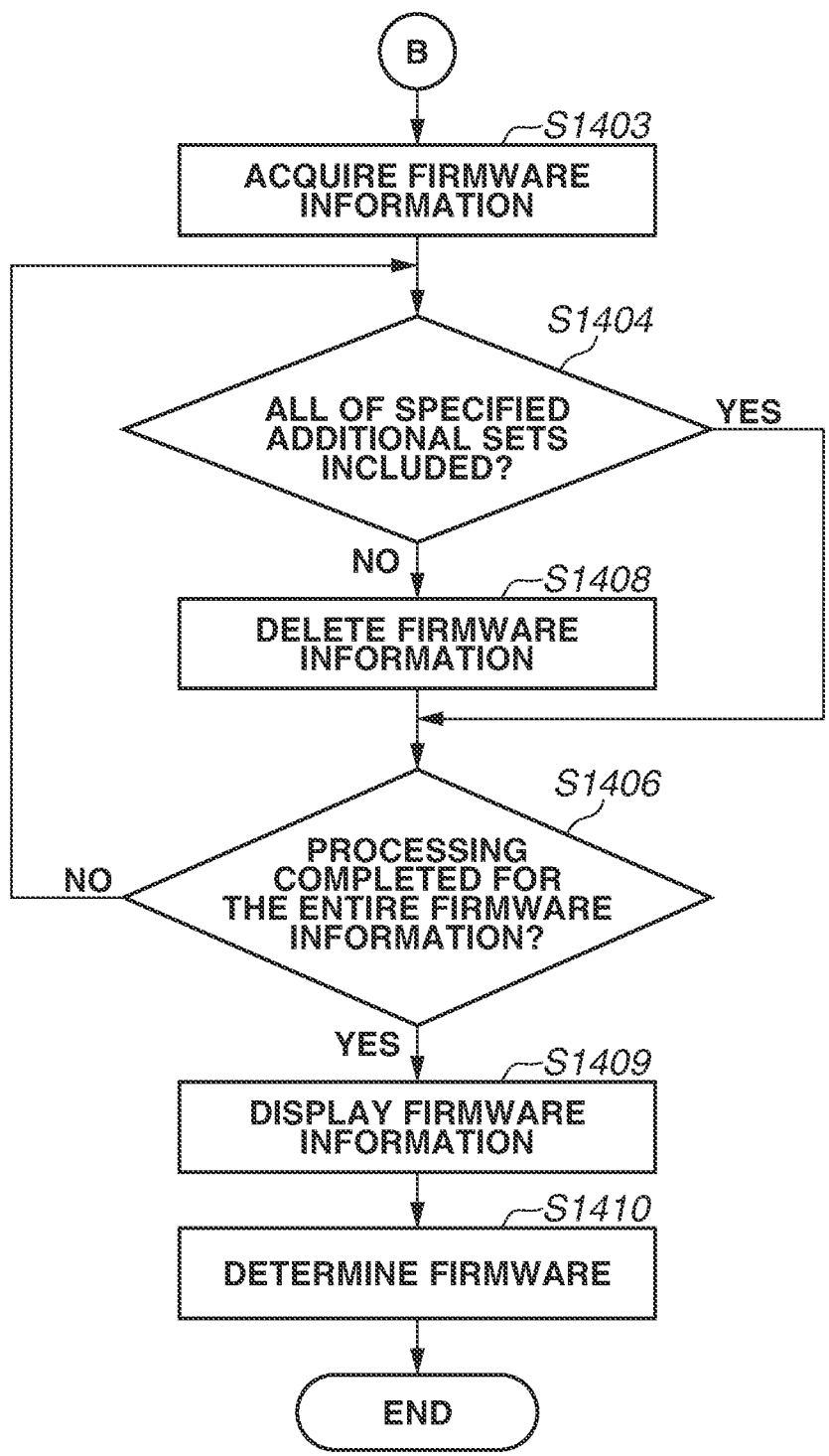

BASIC SETS: [Ver.500 ▼] } *1501*

ADDITIONAL SETS:
- ☒ GREEK
- ☐ HUNGARIAN
- ☐ BULGARIAN
- ☒ FINNISH
- ☒ SWEDISH
- ☐ ESTONIAN

} *1502*

OK    CANCEL

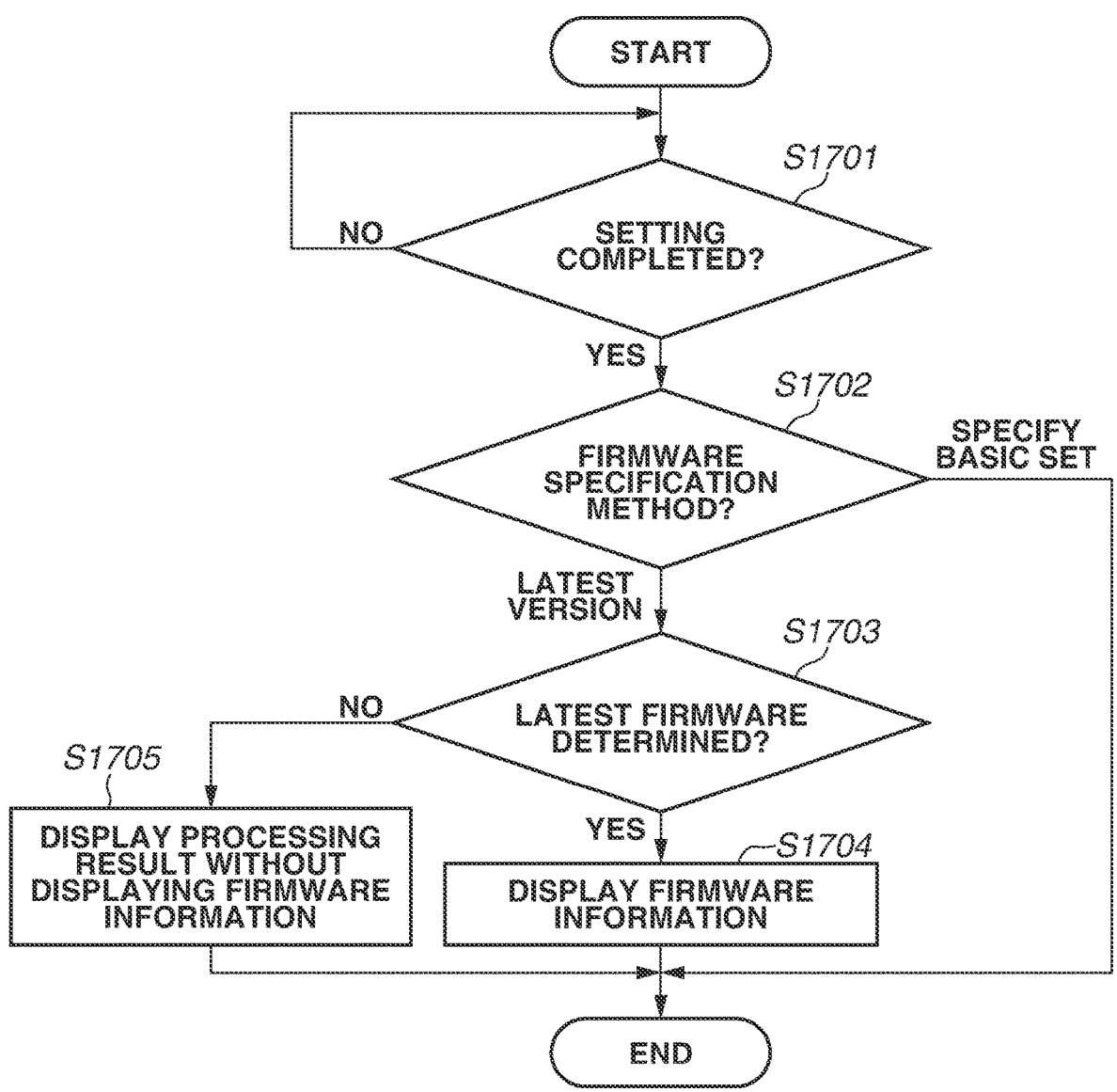

FIG.18

```
<?xml version="1.0" encoding="utf-8" ?>
<script xmlns:xsi="http://www.XXX.com/XMLSchema">
    <!-- INSTALLATION INFORMATION -->

1301

<!-- INSTALLATION PROCESSING GROUP -->
    <commands>
        <!-- FIRMWARE UPDATE PROCESSING -->

1302,1303,1304,1305

<!-- OPTIONAL FUNCTIONS ACTIVATION PROCESSING -->
        <activateOptionCommand order="2">
            <dirpath>opts</dirpath>
            <name>opt_qrcode.lic</name>
        </activateOptinoCommand>                                   } 1802

<!-- EXPANSION PROGRAM INSTALLATION PROCESSING -->
        <installApplicationCommand order="3">
            <dirpath>apps</dirpath>
            <name>application01.jar</name>
            <name>license.lic</name>
        </installApplicationCommand>                               } 1803

<!-- SETTING DATA IMPORT PROCESSING -->
        <importDeviceConigCommand order="4">
            <dirpath>settings</dirpath>
            <name>SETTING VALUES FOR BUSINESS TALK 1212.zip</name>
        </importDeviceConigCommand>                                } 1804
    </commands>
</script>
```

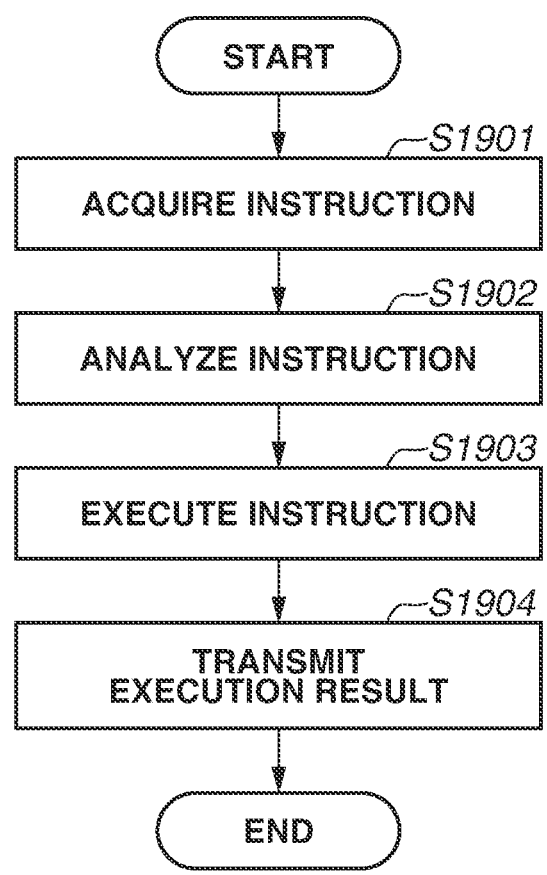

SETTING SYSTEM, CONTROL METHOD, AND STORAGE MEDIUM

BACKGROUND

Field of the Disclosure

The present disclosure relates to a setting system for setting an image forming apparatus, a control method, and a storage medium.

Description of the Related Art

In introducing an image forming apparatus, it is necessary to perform setting processing for firmware, setting values of many different items, and applications. Japanese Patent Application Laid-Open No. 2015-205499 discusses a system in which an image forming apparatus downloads an instruction (script) describing setting procedures for automatically performing setting processing, from an instruction management server, and the setting processing for the image forming apparatus is automatically performed. The instruction discussed in Japanese Patent Application Laid-Open No. 2015-205499 describes the serial number and the model of the image forming apparatus and the firmware version to be set to the image forming apparatus, in addition to the setting procedures.

SUMMARY

A setting system includes an image forming apparatus, an information processing apparatus configured to generate an instruction describing setting procedures for setting functions of the image forming apparatus, and a server configured to manage firmware as software for implementing the functions. The information processing apparatus includes a specification unit configured to specify firmware of the latest version to be set to the image forming apparatus when performing the setting processing without specifying a version of the firmware, and a generation unit configured to generate the instruction based on the content specified by the specification unit. The image forming apparatus includes an acquisition unit configured to identify the firmware to be set to the image forming apparatus based on the instruction generated by the generation unit, and acquire the identified firmware from the server.

Further features of the present disclosure will become apparent from the following description of exemplary embodiments with reference to the attached drawings.

BRIEF DESCRIPTION OF THE DRAWINGS

FIG. 7 illustrates an example of a functional configuration of an instruction execution program.

FIG. 8A illustrates an example of an instruction generation screen.

FIG. 9 illustrates an example of an additionally set combination display dialog.

FIG. 13 illustrates an example of an instruction.

FIG. 14B is another flowchart illustrating a flow of processing of the instruction execution program.

FIG. 14C is yet another flowchart illustrating a flow of processing of the instruction execution program.

FIG. 15 illustrates an example of an operation screen of the image forming apparatus.

FIG. 17 illustrates processing for displaying the setting ending screen.

FIG. 18 illustrates an example of a setting processing instruction.

FIG. 19 is a flowchart illustrating setting processing in the image forming apparatus.

DESCRIPTION OF THE EMBODIMENTS

According to Japanese Patent Application Laid-Open No. 2015-205499, in order to set firmware of the latest version to an image forming apparatus, the version is specified on an instruction. However, in regular setting operations, it may take a certain amount of time from when the instruction is generated until the image forming apparatus downloads the instruction. Therefore, the firmware that is the latest version at the time of generating the instruction may no longer be the latest version at the time when the image forming apparatus downloads the instruction.

It is troublesome to generate the instruction again each time the firmware of the latest version is released. If a user recognizes the firmware of the latest version to be released at the time of generating the instruction, the user can specify the version at the time of generating the instruction. However, all users may not necessarily recognize the version.

Embodiments of the present disclosure are directed to setting firmware of the latest version for an image forming apparatus without specifying the firmware of the latest version at the time of generating an instruction.

According to embodiments of the present disclosure, it is possible to set firmware of the latest version for an image forming apparatus without specifying the firmware of the latest version at the time of generating an instruction.

Exemplary embodiments of the present disclosure will be described below with reference to the accompanying drawings.

Figure 1:
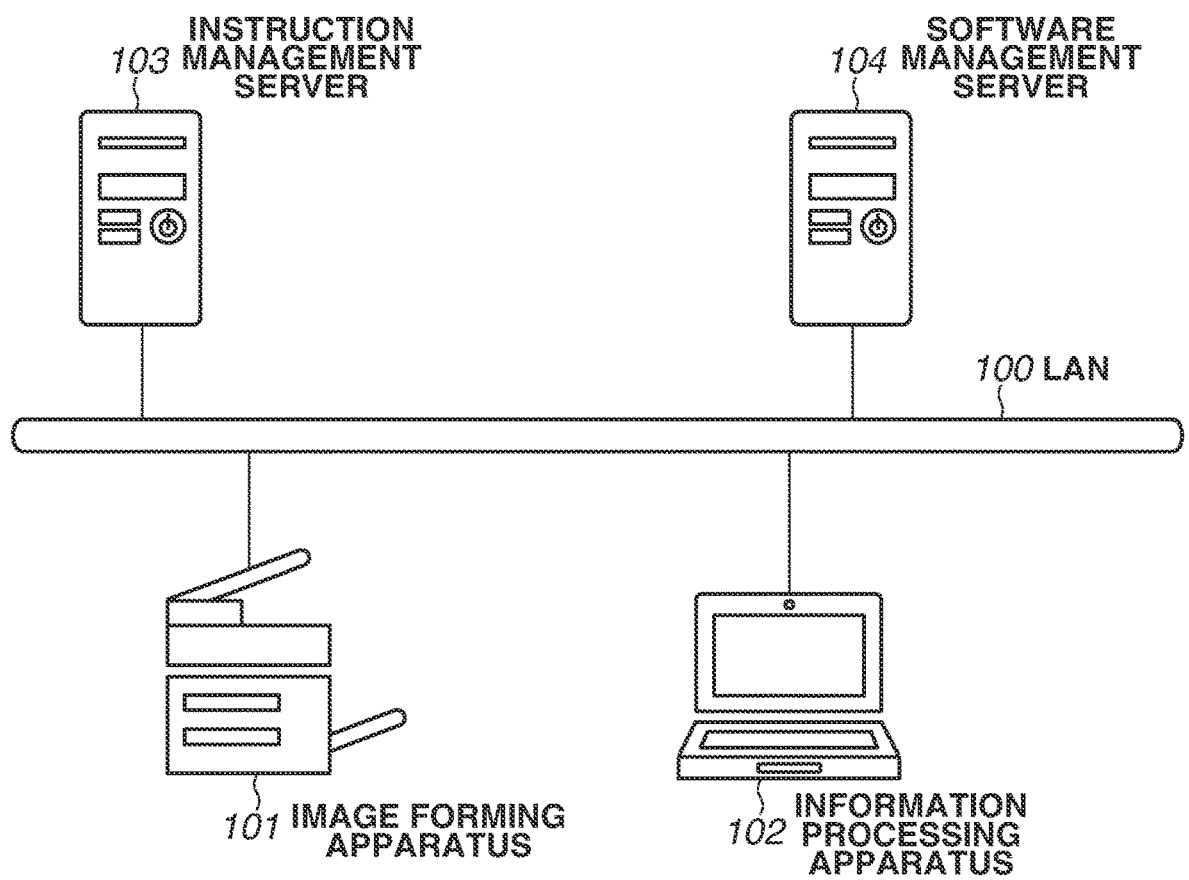
FIG. 1 illustrates an example of a system configuration of the present disclosure.

FIG. 1 illustrates a configuration of a setting system according to the present disclosure.

The setting system according to embodiments of the present disclosure includes an image forming apparatus 101, an information processing apparatus 102, an instruction management server 103, and a software management server 104 which are connected to a local area network (LAN) 100.

The image forming apparatus 101 is a multifunction peripheral that integrates a plurality of functions including scanner, printer, facsimile, and file transmission functions. The image forming apparatus 101 downloads an instruction from the instruction management server 103 and performs setting processing based on the instruction. At this timing, the image forming apparatus 101 communicates with the software management server 104 to download software necessary for the setting processing. The instruction refers to a script describing setting procedures for automatically performing the setting processing.

The information processing apparatus 102 is a so-called personal computer. The information processing apparatus 102 generates the instruction for performing the setting processing of the image forming apparatus 101 and uploads the instruction to the instruction management server 103.

The instruction management server 103 is a server for managing the instruction generated by the information processing apparatus 102. The instruction management server 103 transmits a specific instruction in response to a request from the image forming apparatus 101 or receives a processing result related to the execution of the instruction by the image forming apparatus 101.

The software management server 104 accumulates and manages software (e.g., firmware and applications) to be installed in the image forming apparatus 101 and, in response to a request from the image forming apparatus 101, transmits specific software to the image forming apparatus 101. The instruction management server 103 and the software management server 104 may be directly connected to the LAN 100 or connected with each other via the Internet.

The firmware in the software management server 104 is software including one basic set and a plurality of additional sets accompanying the basic set. The firmware includes basic functions provided as a standard to the image forming apparatus 101 and language resources corresponding to main languages. The image forming apparatus 101 does not operate if the firmware is not installed.

The basic set is identified by the firmware version. Optional functions implementable by the firmware of a specific version are managed as additional sets in association with the basic set. In the present exemplary embodiment, language resources of optional display languages are assumed as additional sets for convenience of description, the present disclosure is not limited thereto. Additional sets may include, for example, electronic manuals applicable to the basic functions, software for implementing optional functions other than display languages, and language resources of additional languages to be added depending on sales channels. However, if the firmware as the basic set is not installed, the additional sets associated with the basic set cannot be installed in the image forming apparatus 101.

When a plurality of additional sets is associated with the basic set, it is guaranteed that these additional sets are operable in combination. For example, in a case where the additional sets are language resources and a plurality of additional sets is associated with the basic set, the image forming apparatus 101 to which the firmware identified by the basic set is set can display a plurality of display languages identified by the additional sets.

Figure 2:
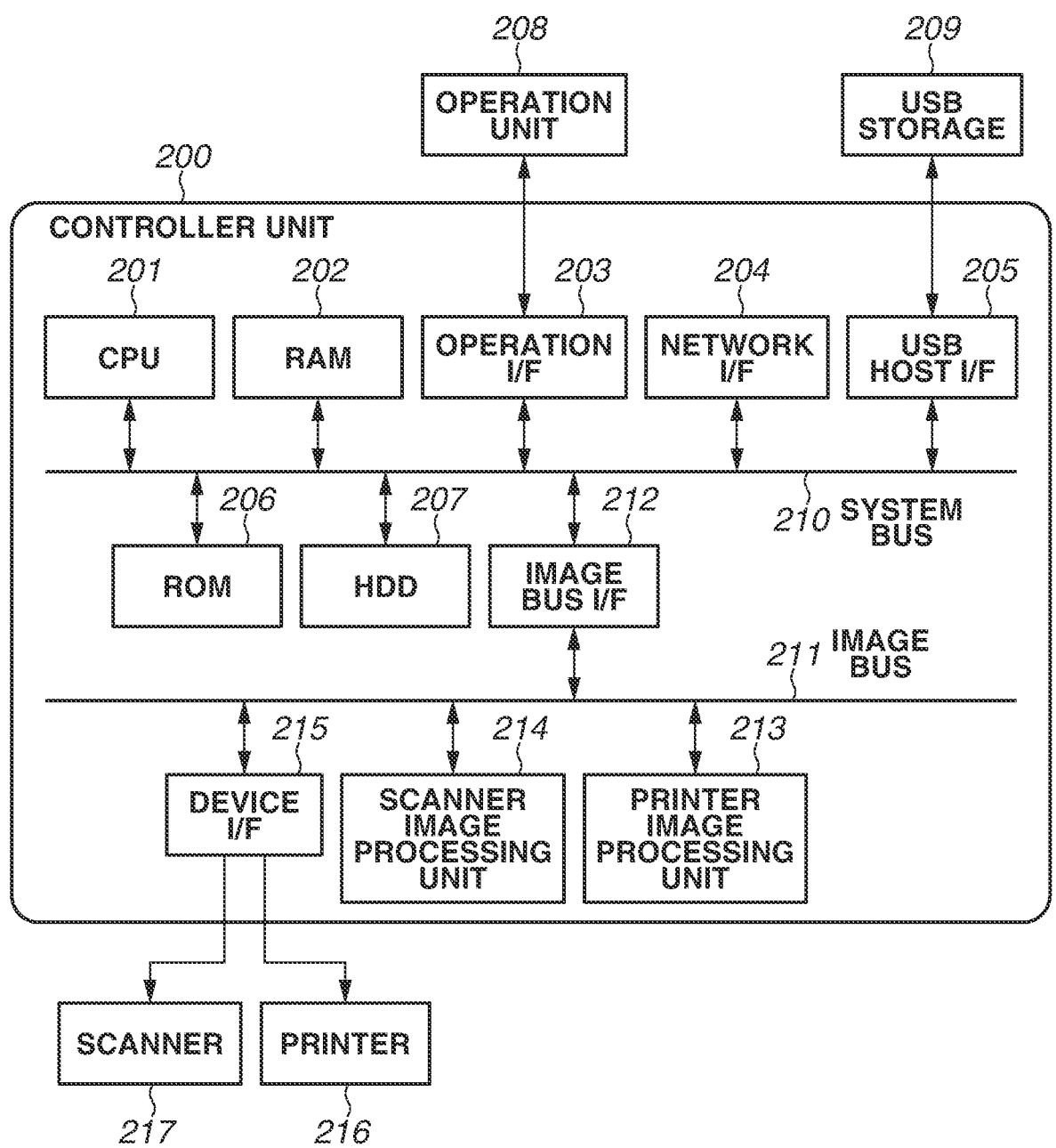
FIG. 2 is a block diagram illustrating an example of a configuration of main portions of an image forming apparatus.

FIG. 2 is a block diagram illustrating an example of a configuration of main portions of the image forming apparatus 101.

The image forming apparatus 101 includes a controller unit 200 to which a scanner 217 as an image input device, a printer 216 as an image output device, and an operation unit 208 are connected. The controller unit 200 controls the implementation of a copy function in which the scanner 217 reads image data and the printer 216 prints an image.

The controller unit 200 includes a central processing unit (CPU) 201 which activates an operation system (OS) stored in a read only memory (ROM) 206, via a boot program. The CPU 201 executes programs stored in a hard disk drive (HDD) 207 on the OS to performs various processing. A random access memory (RAM) 202 is used as a work area for the CPU 201. The RAM 202 offers a work area and an image memory area for temporarily storing image data. The HDD 207 stores the above-described programs and image data.

The CPU 201 is connected with the ROM 206, the RAM 202, an operation unit IN 203, a network I/F 204, a universal serial bus (USB) host I/F 205, and an image bus I/F 212 via a system bus 210.

The operation unit I/F 203 is an interface with the operation unit 208 having a touch panel for outputting image data to be displayed on the operation unit 208, to operation unit 208. The operation unit I/F 203 sends out information input from the operation unit 208 by the user, to the CPU 201.

The network I/F 204 is an interface for connecting the image forming apparatus 101 to the LAN.

The USB host I/F 205 is an interface for communicating with a USB storage 209. The USB host I/F 205 outputs data stored in the HDD 207 to the USB storage 209. The USB host I/F 205 inputs data stored in the USB storage 209 and transfers the data to the CPU 201. The USB storage 209 as an external data storage device is detachably attached to the USB host I/F 205. A plurality of USB apparatuses including the USB storage 209 can be connected to the USB host I/F 205.

The image bus I/F 212 serves as a bus bridge for connecting the system bus 210 and an image bus 211 for transferring image data at high speed to convert the data format. The image bus 211 is configured by a Peripheral Component Interconnect (PCI) bus or Institute of Electrical and Electronics Engineers (IEEE)1394. On the image bus 211, a device I/F 215, a scanner image processing unit 214, and a printer image processing unit 213 are provided.

The device I/F 215 connected with the scanner 217 and the printer 216 converts synchronous image data to asynchronous image data and vice versa. The scanner image processing unit 214 corrects, processes, and edits input image data. The printer image processing unit 213 performs correction and resolution conversion on print output image data suitable for the printer 216.

Figure 3:
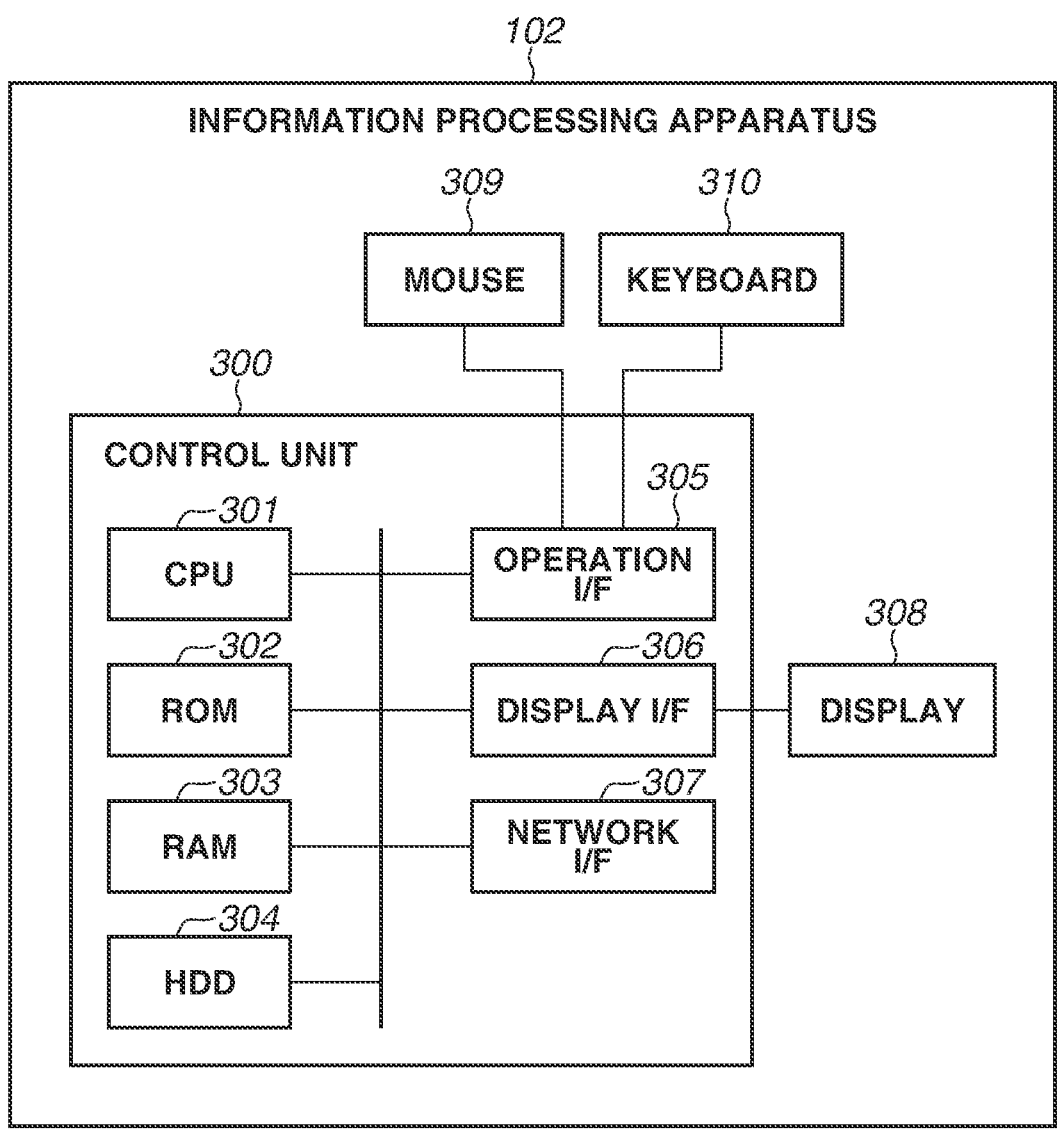
FIG. 3 is a block diagram illustrating an example of a configuration of an instruction generation apparatus.

FIG. 3 is a block diagram illustrating a configuration of the information processing apparatus 102. A control unit 300 including a CPU 301 controls the operations of the entire information processing apparatus 102. The CPU 301 reads control programs stored in a ROM 302 and performs various control processing. A RAM 303 is used as a main memory for the CPU 301 and a temporary storage area such as a work area. An HDD 304 stores image data and several different programs.

An operation unit I/F 305 is an interface for connecting a user interface terminal for inputting control operations to a program executed by the information processing apparatus 102. Although, in the present exemplary embodiment, the operation unit OF 305 includes a mouse 309 and a keyboard 310, the present disclosure is not limited thereto.

A display I/F 306 is an interface for connecting a display terminal for displaying a user interface (UI) of a program executed by the information processing apparatus 102. Although, in the present exemplary embodiment, the display I/F 306 connects a display 308, the present disclosure is not limited thereto.

A network I/F 307 connects the control unit 300 to the LAN 100. The network I/F 307 transmits and receives various information to/from other apparatuses via a network.

Figure 4:
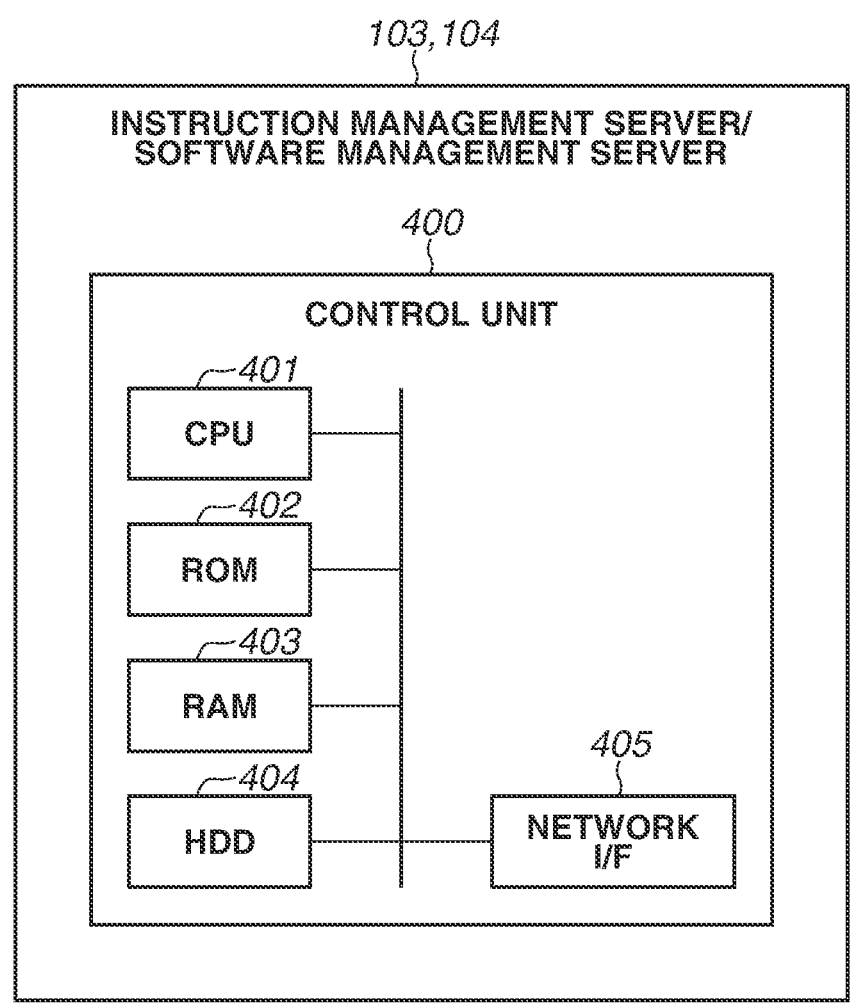
FIG. 4 is a block diagram illustrating an example of a configuration of management servers.

FIG. 4 is a block diagram illustrating a configuration of the instruction management server 103 and the software management server 104. A control unit 400 including a CPU 401 controls the operations of the instruction management server 103 and the software management server 104. The CPU 401 reads control programs stored in a ROM 402 and performs various control processing. A RAM 403 is used as a main memory of the CPU 401 and a temporary storage area such as a work area.

In the instruction management server 103, the HDD 404 stores an instruction transmitted from the information processing apparatus 102 and a result of executing the instruction by the image forming apparatus 101. In the software management server 104, the HDD 404 stores software.

A network I/F 405 connects a control unit 400 to the LAN 100. The network I/F 405 transmits and receives various information to/from other apparatuses via a network.

Figure 5:
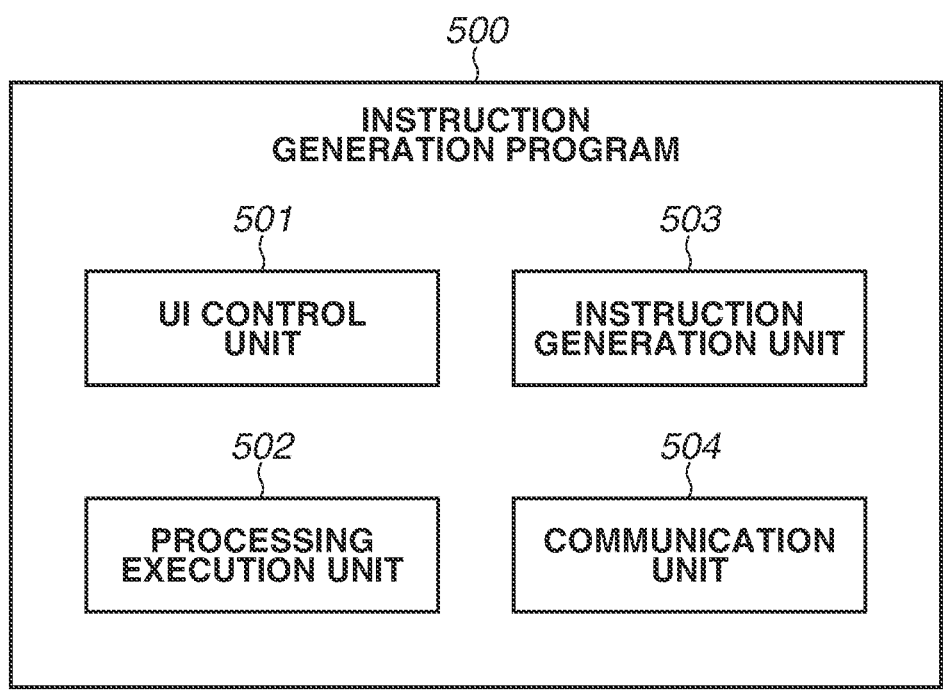
FIG. 5 illustrates an example of a functional configuration of an instruction generation program.

FIG. 5 illustrates a functional configuration of an instruction generation program 500 operating on the information processing apparatus 102. Various functions are implemented in the information processing apparatus 102 when the CPU 401 executes the instruction generation program 500. The main subject which carries out the instruction generation program 500 is not limited to the information processing apparatus 102. For example, an instruction may be generated by using a server on the network via the network I/F 307.

The instruction generation program 500 includes a UI control unit 501, a processing execution unit 502, an instruction generation unit 503, and a communication unit 504. The UI control unit 501 provides an operator with a UI for executing and operating the instruction generation program 500, via the display 308, and receives operations of the operator via the mouse 309 and the keyboard 310. The processing execution unit 502 performs processing according to instructions of the UI control unit 501.

The instruction generation unit 503 generates an instruction in a format interpretable by the image forming apparatus 101 according to instructions from the processing execution unit 502. According to instructions of the processing execution unit 502, the communication unit 504 transmits the instruction generated by the instruction generation unit 503 to the instruction management server 103 and acquires an instruction stored in the instruction management server 103.

Figure 6:
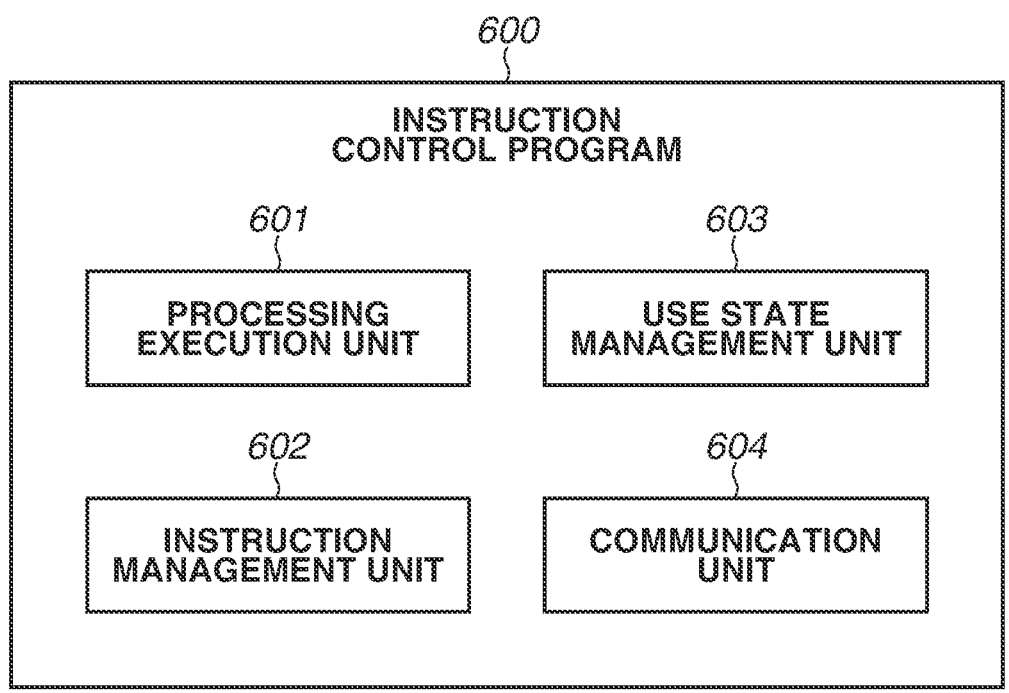
FIG. 6 illustrates an example of a functional configuration of an instruction management program.

FIG. 6 illustrates a functional configuration of an instruction control program 600 operating on the instruction management server 103. Each function is implemented when the CPU 401 executes the instruction control program 600. The instruction control program 600 includes a processing execution unit 601, an instruction management unit 602, a use state management unit 603, and a communication unit 604.

The processing execution unit 601 acquires requests from the image forming apparatus 101 and the information processing apparatus 102 via the communication unit 604 and performs processing.

The instruction management unit 602 associates the instruction generated by the information processing apparatus 102 with various information as the basis of the instruction generation, and accumulates and manages the instruction and information. Various information includes information about the firmware version specified in the instruction and information for identifying additional applications.

The use state management unit 603 accumulates and manages a situation and result of executing the instruction by the image forming apparatus 101.

The communication unit 604 receives requests from the image forming apparatus 101 and the information processing apparatus 102 and transmits the instruction and other necessary information in response to requests.

FIG. 7 is a functional configuration of an instruction execution program 700 operating on the image forming apparatus 101. Although, in the present exemplary embodiment, the instruction execution program 700 is considered to be implemented as a program of the image forming apparatus 101, the implementation form is not limited thereto.

The instruction execution program 700 includes a UI control unit 701, a processing execution unit 702, an instruction analysis unit 703, a command execution unit 704, an execution order determination unit 705, an execution result generation unit 706, and a communication unit 707.

The UI control unit 701 provides the user with an UI for operating the instruction execution program 700, via the operation unit 208, and accepts operations of the user.

The processing execution unit 702 performs various processing according to instructions of the UI control unit 701.

The instruction analysis unit 703 analyzes the instruction received from the instruction management server 103 to convert information into commands and generates information necessary to generate an execution result.

Based on the contents of the analysis by the instruction analysis unit 703, the command execution unit 704 requests each service of the image forming apparatus 101 to perform processing, executes functions, and also notifies the execution result generation unit 706 of an execution result of the specified processing.

The execution order determination unit 705 determines the execution order of each command based on the contents of the analysis by the instruction analysis unit 703.

The execution result generation unit 706 generates an execution result for each command and an execution result for the entire instruction based on the execution result for each service and function notified from the command execution unit 704.

The communication unit 707 receives the instruction transmitted from the instruction management server 103 and transmits an execution result to the instruction management server 103. The communication unit 707 also receives software from the software management server 104.

Figure 8B:
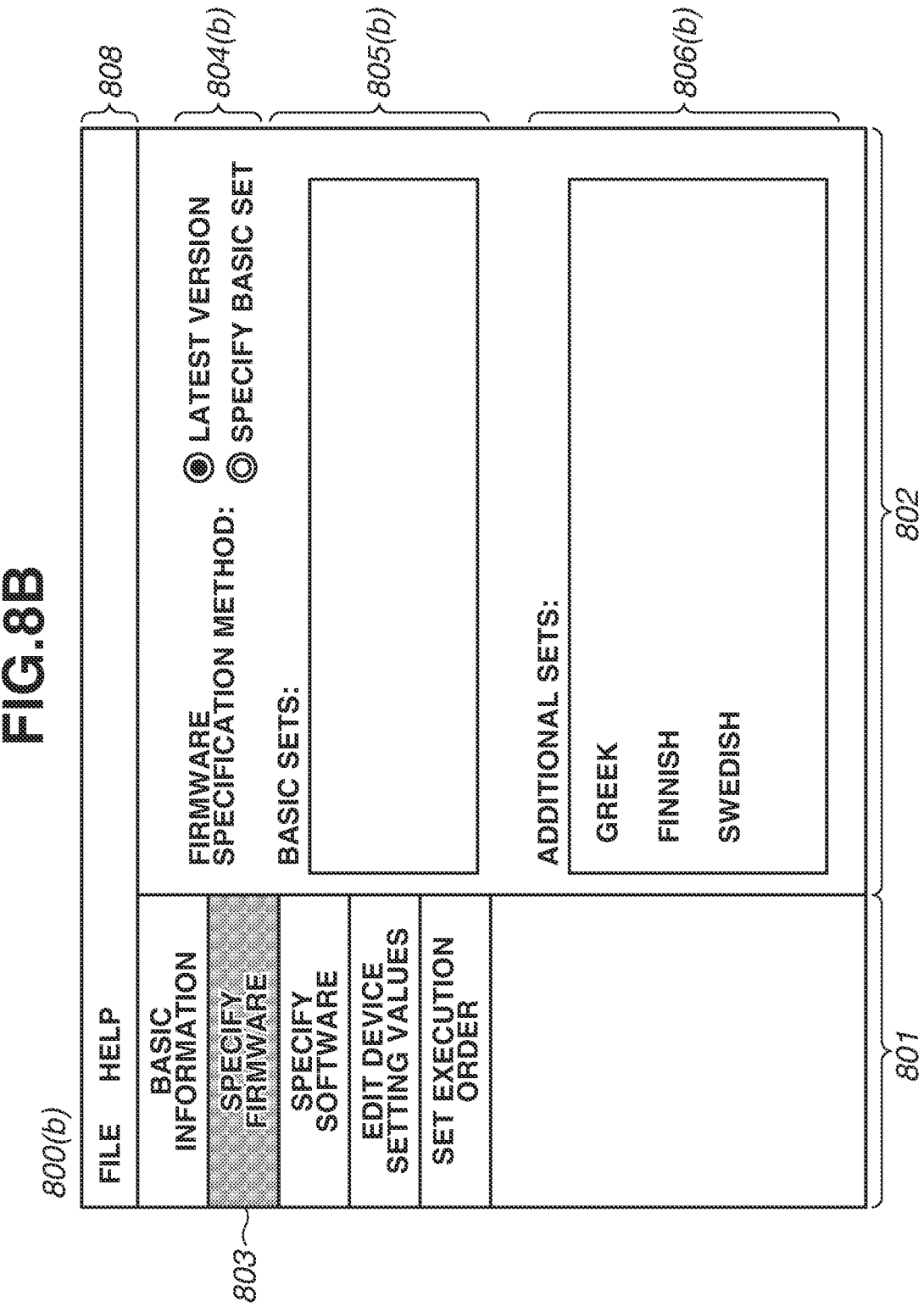
FIG. 8B illustrates another example of an instruction generation screen.

FIGS. 8A, 8B, and 9 illustrate examples of instruction generation screens displayed on the information processing apparatus 102. These screens are UIs generated by the instruction generation program 500. Each of instruction generation screens 800A and 800B includes three areas: a page selection tab area 801, a setting area 802, and a menu 808.

Before the instruction generation screens 800A and 800B are displayed, a screen (not illustrated) for specifying the model of the image forming apparatus 101 is displayed. In this screen, the user specifies the image forming apparatus that executes an instruction to be generated, Basic information about the specified image forming apparatus 101 can be browsed by opening a "Basic Information" tab in the page selection tab area 801.

When a "Specify Firmware" tab 803 in the page selection tab area 801 is selected, the instruction generation program 500 displays specification items related to the firmware to be installed in the image forming apparatus 101 in the setting area 802.

"Firmware Specification Method" radio buttons are used, after specifying the version of the firmware (basic set), to specify either one of two different methods: a method for selecting additional sets (setting 804A) and a method for applying the firmware of the latest version at the time when the image forming apparatus 101 executes the instruction execution program 700 (setting 804B).

When an instruction editor selects "Specify Basic Set", the instruction generation program 500 acquires basic set information about the firmware installable in the image forming apparatus 101 from the software management server 104, and displays a list of the information in a basic set information area 805A. When the instruction editor selects one basic set of a specific version from the "Basic Sets" list, the instruction generation program 500 acquires information about the additional sets associated with the basic set from the software management server 104, and displays a list of the information in an additional set information area 806B.

FIG. 8A illustrates a case where additional sets Greek, Hungarian, Bulgarian, Finnish, and Swedish associated with the basic set "Ver. 200" are managed by the software management server 104.

The instruction editor can select desired additional sets from the "Additional Sets" list illustrated in FIG. 8A. It is also possible that no specific additional sets is selected from the desired additional sets. In this case, none of the additional sets is set to the image forming apparatus 101.

When generating an instruction, the instruction generation program 500 identifiably describes the basic set specified in the basic set information area 805A and the additional sets specified in the additional set information area 806A. In this case, the basic and additional sets may be specified by using their specific names or identifiers, or other formats as long as specified contents can be identified.

When the instruction editor selects "Latest Version" for "Firmware Specification Method", the instruction generation program 500 displays a dialog 900 for displaying information about additional set combinations. Although, in the present exemplary embodiment, the dialog 900 is superimposed on the instruction generation screen 800B, the display format of the dialog 900 is not particularly limited thereto.

More specifically, the instruction generation program 500 acquires information about the firmware installable in the image forming apparatus 101 from the software management server 104, and displays a list of the information about the additional sets associated with each basic set as a combination pattern of the additional sets, in a combination list 901 in the dialog 900. A method for displaying information about additional sets will be described in detail below. Combinations of additional sets associated with each basic set managed by the software management server 104 are displayed in the combination list 901 to avoid an overlap with each other.

For example, in a case where the software management server 104 manages additional sets a, b, and c for a basic set A, additional sets a and b for a basic set B, and additional sets d and e for a basic set C in association, the combination list 901 displays the combination of the additional sets a, b, and c, the combination of the additional sets a and b, and the combination of the additional sets d and e. The user selects one of the plurality of displayed combinations and selects display languages to be set to the image forming apparatus 101 from the combinations. More specifically, when the user selects the additional sets a, h, and c, one or more desired display languages are selected from display languages a, b, and c. However, display language selection across different combinations out of the combinations displayed in the combination list 901 is not allowed. For example, the display languages a and d, or the display languages b and e cannot be selected at the same time.

When the instruction editor selects one combination fro the combination list 901, the instruction generation program 500 displays the combination in a display area 902, in such a format that allows selection of the corresponding additional sets. The display area 902 displays a list of the additional sets included in the combination selected in the combination list 901 by the user. The user can select additional sets in an arbitrary combination by using check boxes in the display area 902.

When the user selects desired additional sets in the display area 902 and then presses an OK button 903, the instruction generation program 500 redisplays the firmware specification screen (see FIG. 8B). In this case, a basic set information area 805B is blank, and the additional set information area 806B displays only information about the additional sets selected in the dialog 900.

The instruction generation program 500 identifiably describes the additional sets in this way. When the combination of additional sets selected in the dialog 900 is a new combination, the new combination may be subsequently displayed in the combination list 901 as an additional combination.

This case is different from a case where the version of the basic set is specifically specified, in that information indicating the version of the basic set is not described in the instruction at all and that only information about additional sets (a combination of display languages) is described in the instruction.

Table 1 illustrates an example of a specific configuration of the firmware registered in the software management server 104. Table 1 illustrates combinations of a basic set identified by a first identifier with additional sets identified by another first identifier.

The first identifier of basic or additional sets (see Table 1) is identification information for uniquely identifying basic or additional sets, respectively, registered in the software management server 104. On the other hand, a second identifier of basic or additional sets (see Table 1) is the name of additional sets. The second identifier cannot uniquely identify basic or additional sets. More specifically, the first identifier is an identifier (ID) automatically given by the software management server 104 when registering a basic or additional set in the software management server 104. On the other hand, the second identifier is a name given by a registrant when registering a basic or additional set in the software management server 104.

When "Specify Basic Set" is selected (setting 804A)," the instruction generation program 500 describes in the instruction the first and the second identifiers of a basic set, and the first and the second identifiers of additional sets selected by the instruction editor out of the related additional sets.

When "Latest Version" is selected (setting 804B), the instruction generation program 500 does not describe in the instruction the information about a basic set since no basic set is identified but describes in the instruction only the second identifier of the additional sets specified by the instruction editor. For example, when the instruction editor specifies Greek, the instruction generation program 500 describes only "Greek" in the instruction. When the instruction execution program 700 executes the instruction, the basic set of Ver. 400 is applied thereto as the latest version out of the basic sets of Vers. 100, 200, and 400 which support Greek.

TABLE 1

| Basic set | | Additional set | |
|---|---|---|---|
| First identifier | Second identifier | First identifier | Second identifier |
| 1000 | Ver. 100 | 1001 | Greek |
| | | 1002 | Finnish |
| 2000 | Ver. 200 | 2001 | Greek |
| | | 2002 | Hungarian |
| | | 2003 | Bulgarian |
| | | 2004 | Finnish |
| | | 2005 | Swedish |
| 3000 | Ver. 300 | 3001 | Bulgarian |
| | | 3002 | Finnish |
| | | 3003 | Swedish |
| 4000 | Ver. 400 | 4001 | Greek |
| | | 4002 | Finnish |

A setting item 904 in the dialog 900 is used to specify whether to add a new additional set to the additional sets selected in the display area 902 when the image forming apparatus 101 executes the instruction. More specifically, the setting item 904 can be used in a case where the user recognizes a new additional set (display language) that does not exist in the software management server 104 when specifying additional sets in the dialog 900 but exists in the software management server 104 at the timing when the image forming apparatus 101 executes the instruction. By checking the setting item 904, new additional sets are displayed in the list (a screen 1500 described below) when the image forming apparatus 101 executes the instruction.

The instruction generation screens 800A and 800B and the dialog 900 are to be considered as examples and do not limit operability and design.

Figure 10:
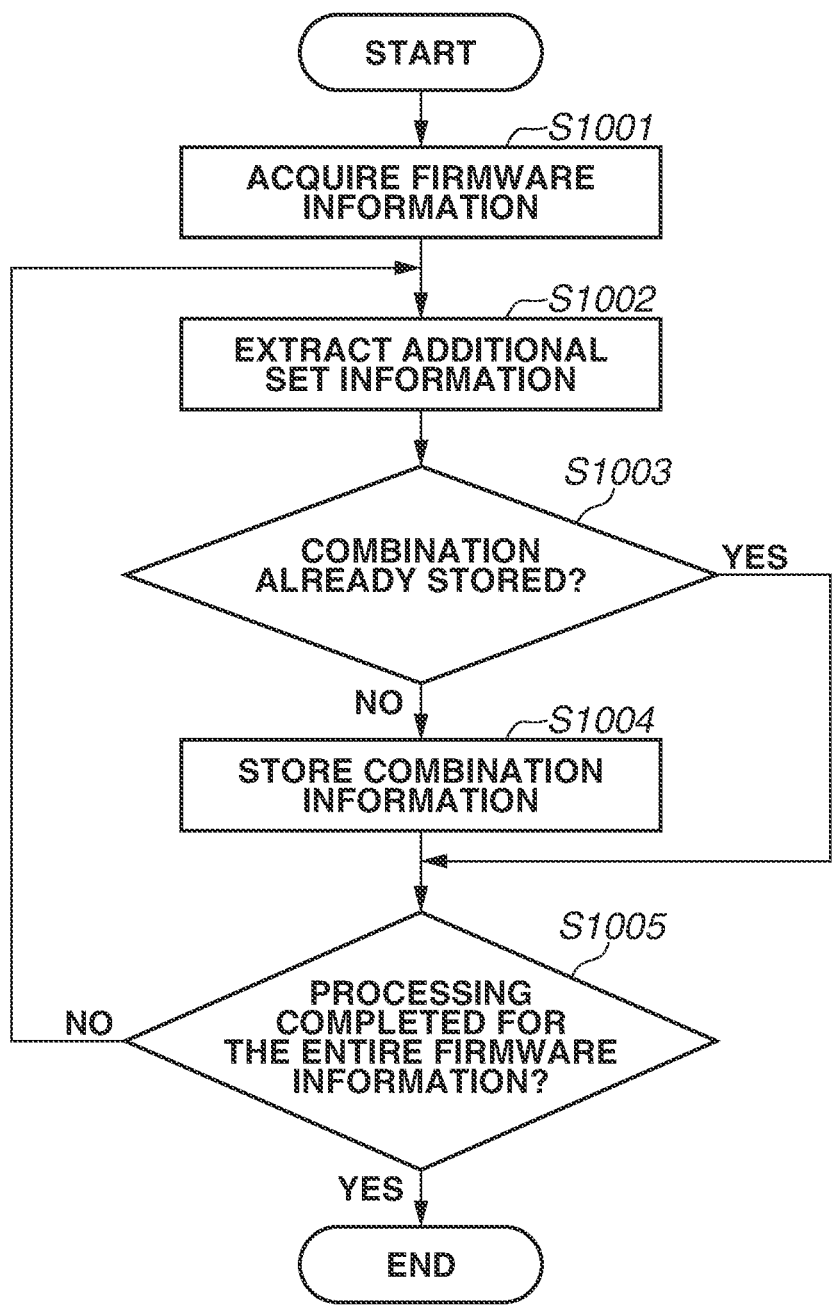
FIG. 10 is a flowchart illustrating a flow of processing of the instruction generation program.

FIG. 10 is a flowchart illustrating a flow of processing executed by the instruction generation program 500 of the information processing apparatus 102 to display the dialog 900. This flowchart is executed upon selection of "Latest Version" for "Firmware Specification Method".

In step S1001, the processing execution unit 502 of the instruction generation program 500 acquires information about the firmware applicable to the target image forming apparatus 101 from the software management server 104. When acquiring the information, identification information for identifying the image forming apparatus 101 pre-specified by the user is transmitted to the software management server 104. The management server 104 identifies basic set information and additional set information to be transmitted to the information processing apparatus 102. An example of information to be transmitted to the information processing apparatus 102 is indicated in Table 1.

In step S1002, the processing execution unit 502 extracts information about additional sets associated with one basic set from the firmware information acquired in step S1001 and temporarily stores the information in the RAM 303.

In step S1003, the processing execution unit 502 determines whether the combination of additional sets extracted in step S1002 already exists in the information about additional set combinations stored in the HDD 304. When the instruction generation program 500 executes this flowchart for the first time, there is no comparison target in step S1003 in the HDD 304. When the instruction generation program 500 executes this flowchart for the second and subsequent times, the processing execution unit 502 compares the information about the existing additional set combinations with the information about additional set combinations in step S1001.

When the information acquired in step S1001 is different from the existing combination information (NO in step S1003), the processing proceeds to step S1004. In step S1004, the processing execution unit 502 stores the additional set information in the RAM 303 and the number of additional sets included therein, in the HDD 304 as new combination information, and deletes the information in the RAM 303. On the other hand, if the information acquired in step S1001 matches with the existing combination information (YES in step S1003), the processing execution unit 502 does not store the acquired information in the HDD 304 and deletes the information in the RAM 303. Then, the processing proceeds to step S1005.

In step S1005, the processing execution unit 502 determines whether the processing from steps S1002 to S1004 is completed for the entire additional set information acquired in step S1001. When the processing is not completed for part of the firmware information (NO in step S1005), the processing returns to step S1002. The processing execution unit 502 repeats the processing in step S1002 and subsequent steps. On the other hand, when the processing in steps S1002 to S1004 is completed for the entire firmware information (YES in step S1005), the processing execution unit 502 ends the processing of this flowchart.

The processing illustrated in FIG. makes it possible to display a list of additional set combinations in the combination list 901 in a non-redundant way. For example, if the firmware versions illustrated in Table 1 are registered in the software management server 104, the combination information stored in the HDD 304 is as illustrated in Table 2. Referring to Table 1, since the additional set information for the firmware of Vers. 100 and 400 is redundant, and the additional set information for the firmware of Vers. 200 and 300 is non-redundant, the combination information is classified into three different categories as illustrated in Table 2.

TABLE 2

| Combination | Second identifier |
|---|---|
| First combination | Greek |
| | Finnish |
| Second combination | Greek |
| | Hungarian |
| | Bulgarian |
| | Finnish |
| | Swedish |
| Third combination | Bulgarian |
| | Finnish |
| | Swedish |

The instruction generation program 500 displays the combination information illustrated in Table 2, in the combination list 901 in the dialog 900. Although the combination information is displayed in descending order of the number of additional sets included in each combination, it does not matter in what order the combination information is displayed.

Figure 11:
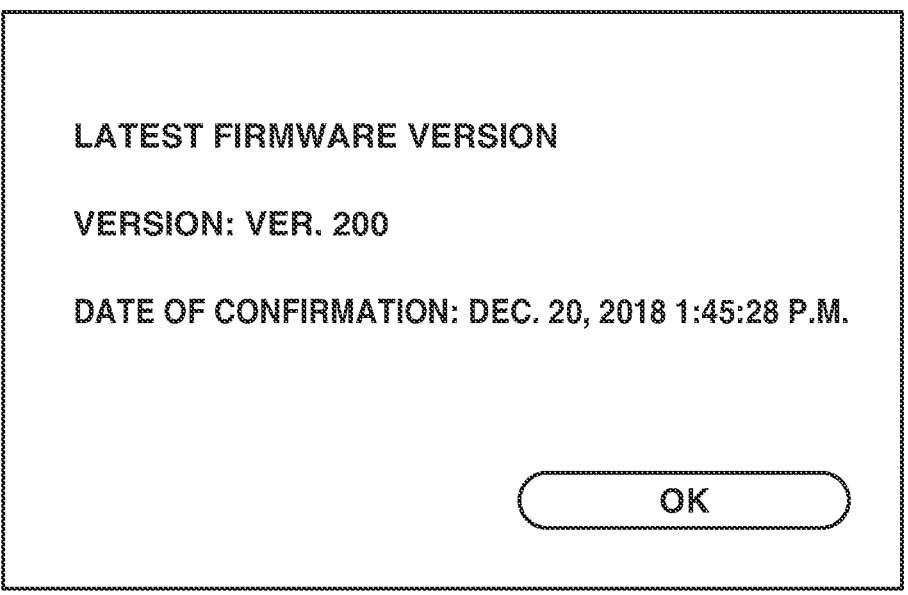
FIG. 11 illustrates an example of a latest version display dialog.
Figure 12:
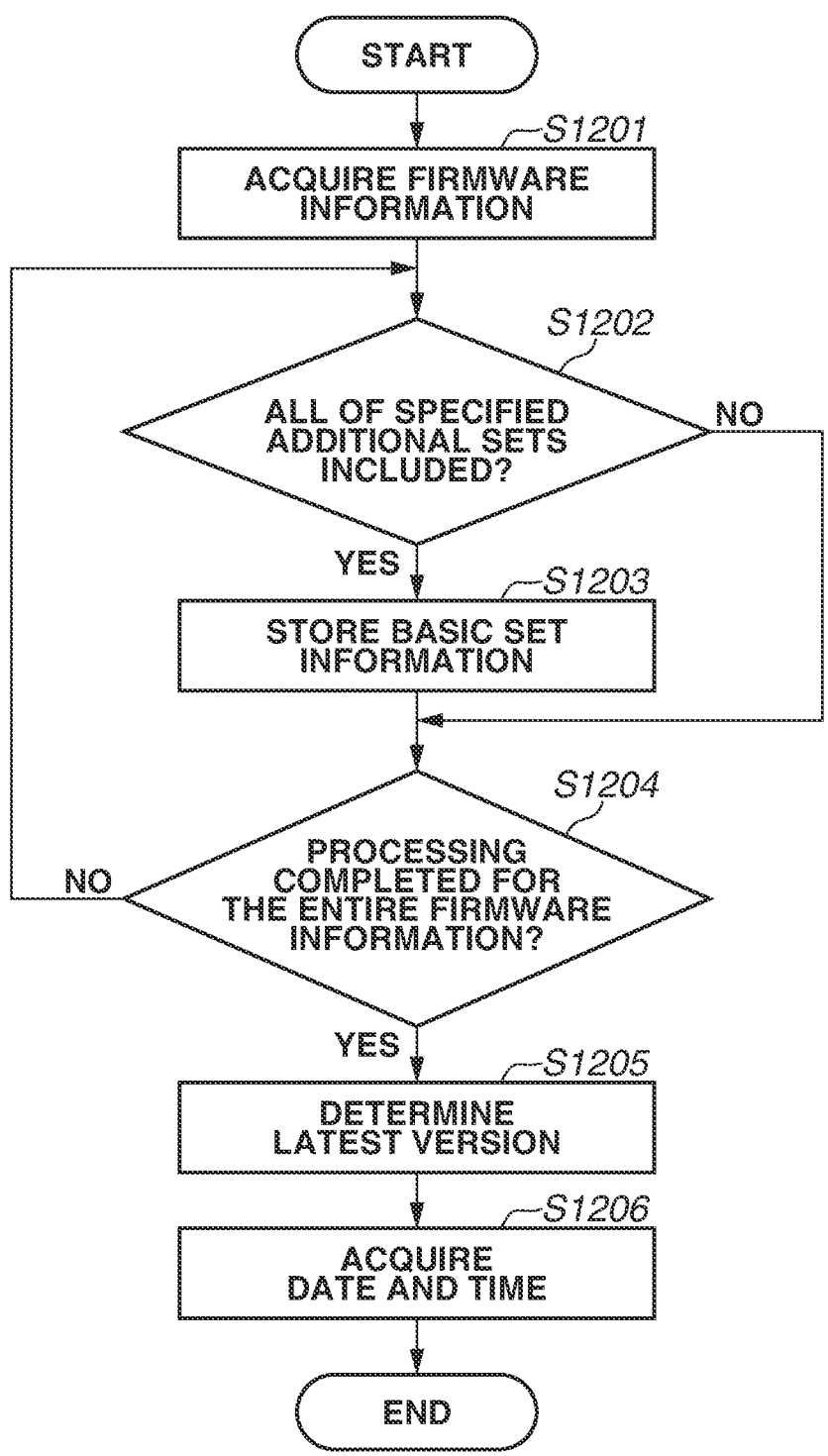
FIG. 12 is a flowchart illustrating a flow of processing of the instruction generation program.

FIG. 12 illustrates a flow of processing executed by the instruction generation program 500 to display a version confirmation dialog 1100 (see FIG. 11). This processing is executed upon depression of the Help button of the menu 808 in the instruction generation screens 800A and 800B in a state where additional set information has been acquired. The instruction generation program 500 displays the latest firmware version and the date and time of confirmation when the version confirmation dialog 1100 is displayed according to the settings on the instruction generation screens 800A and 800B.

In step S1201, the processing execution unit 502 of the instruction generation program 500 acquires information about the firmware applicable to the target image forming apparatus 101 from the software management server 104. The acquired information includes the entire information about basic sets and additional sets, as illustrated in Table 1.

In step S1202, the processing execution unit 502 compares the second identifier of the additional sets associated with one basic set with the second identifier of the additional sets specified on the instruction generation screens 800A and 800B. When the acquired information includes all of the additional sets specified on the instruction generation screens 800A and 800B (YES in step S1202), the processing proceeds to step S1203. In step S1203, the processing execution unit 502 stores information about confirmation target basic set (the first and the second identifiers) in the RAM 303.

On the other hand, when the acquired information includes not all of the additional sets (NO in step S1202), the processing skips step S1203 and proceeds to step S1201.

In step S1204, the processing execution unit 502 determines whether the additional set information has been confirmed for all of the firmware versions acquired in step S1201. When the confirmation of the additional set information is not completed for part of the firmware information (NO in step S1204), the processing execution unit 502 repeats the processing in steps S1202 to 1204. On the other hand, when the confirmation of the additional set information is completed for the entire firmware information (YES in step S1204), the processing proceeds to step S1205. In step S1205, the processing execution unit 502 determines the firmware of the latest version based on the information stored in the RAM 303. For example, assume that the firmware illustrated in Table 1 is registered in the software management server 104 and that Bulgarian is specified in the instruction generation screens 800A and 800B. In this case, the basic set information for Vers. 200 and 300 is stored in the RAM 303. The processing execution unit 502 compares the information for Ver. 200 with the information for Ver. 300 to determine the latest version. Methods for determining the latest version depend on the management method performed by the software management server 104. Examples of possible methods for determining the latest version includes a method for setting firmware with a larger version number as a later version, or a method for setting firmware with a later date of registration in the software management server 104 as a later version. On the other hand, when no additional set is specified, the latest firmware version is displayed regardless of additional sets.

In step S1206, the instruction generation program 500 acquires the current date and time of a personal computer as the execution environment of the instruction generation program 500, and displays the latest version and the date and time of confirmation in the version confirmation dialog 1100.

FIG. 13 illustrates example of descriptions in an instruction generated by the instruction generation unit 503 of the instruction generation program 500 according to the settings on the instruction generation screen 800B and the dialog 900.

A description area 1301 is basic information about the instruction, and describes the date and time of generation and the name of the instruction.

A command 1302 corresponding to the setting 804B of the firmware specification method indicates that "Latest Version" is selected for "Firmware Specification Method". On the other hand, when "Specify Basic Set" is selected for "Firmware Specification Method", "<selectType>selected</selectType>" is described in the command 1302.

A description area 1303 describes information about a basic set, Since "Latest Version" is selected for "Firmware Specification Method" (setting 804B), no information is described. When "Specify Basic Set" is selected (setting 804A), the identifier and name for identifying the specified basic set are described in the description area 1303.

A command 1304 corresponding to the setting item 904 indicates that an additional set is further added at the time of the setting processing (when the instruction execution program 700 is executed by the image forming apparatus 101).

A description area 1305 corresponding to the setting of the additional set information area 806B indicates a state where Greek, Finnish, and Swedish are selected. When "Specify Basic Set" is selected (setting 804A) for "Firmware Specification Method", the description area 1305 describes the first and the second identifiers of the basic set specified in the description area 1303 of the basic set information, and describes the first identifier of the additional sets for <addSetId>.

Although an instruction 1300 describes only the firmware information, the instruction 1300 actually describes many different commands including the installation of applications and the import of setting values of the image forming apparatus 101.

Figure 14A:
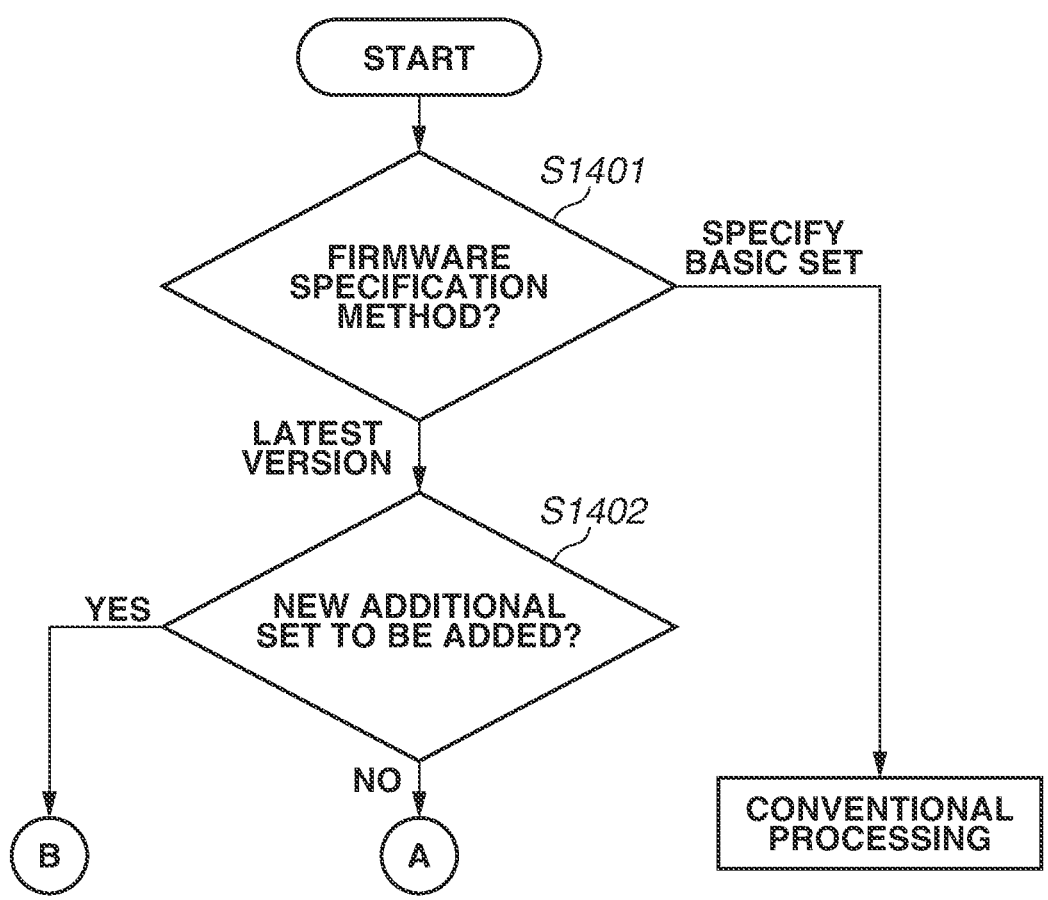
FIG. 14A is a flowchart illustrating a flow of processing of the instruction execution program.

FIGS. 14A to 14C are parts of a flowchart illustrating a flow of processing executed by the instruction execution program 700 to execute the script (see FIG. 13) to determine the latest firmware.

The instruction execution program 700 executes this flowchart on the premise that the instruction analysis unit 703 of the instruction execution program 700 analyzes the instruction 1300 and that necessary information is stored in the RAM 202 of the image forming apparatus 101. In addition, the firmware information to be acquired from the software management server 104 is temporarily stored in the RAM 202.

In step S1401, the command execution unit 704 reads the firmware specification method from the RAM 202. When "Specify Basic Set" is selected (SPECIFY BASIC SET in step S1401), the first identifier of the basic set and the first identifier of the additional sets are stored in the RAM 202. Using the first identifiers of the basic and additional sets, the command execution unit 704 downloads the specified firmware from the software management server 104 and installs the firmware.

On the other hand, when "Latest Version" is specified (LATEST VERSION in step S1401), the processing proceeds to step S1402. In step S1402, the command execution unit 704 determines whether to further add an additional set. More specifically, the command execution unit 704 determines whether a setting item 904 is checked. When the value of the <additionalSw> tag 1304 in the instruction 1300 is ON, the command execution unit 704 performs processing A. On the other hand, when the value of the <additionalSw> tag 1304 is OFF, the command execution unit 704 performs processing B.

[Processing A]

The processing A when "Latest Version" is selected for "Firmware Specification Method" and no additional set is to be added (the value of the <additionalSw> tag 1304 in the instruction 1300 is OFF) will be described below with reference to FIG. 14B.

In step S1403, the command execution unit 704 acquires information about the firmware applicable to the image forming apparatus 101 from the software management server 104 via the communication unit 707. The acquired information includes the entire information for the basic sets and additional sets illustrated in Table 1.

In step S1404, the command execution unit 704 compares the second identifier of the additional sets (equivalent to the <addSetName> tag 1305 in the instruction 1300) described in the instruction 1300 with the second identifier of the additional sets associated with one basic set out of the firmware information acquired from the software management server 104.

When the additional set information read from the firmware information includes the additional set information described in the instruction 1300 (YES in step S1404), the processing proceeds to step S1405. In step S1405, the command execution unit 704 stores the applicable basic set information in the RAM 202. On the other hand, when the additional set information read from the firmware information does not include the additional set information described in the instruction 1300 (or when information identifying additional sets is not described in the instruction 1300) (NO in step S1404), the command execution unit 704 assumes that there is no additional set specified in the instruction 1300 or no basic set associated with the combination of the additional sets. Then, the processing proceeds to step S1406.

In step S1406, the command execution unit 704 determines whether the additional set information has been confirmed for the entire firmware information acquired in step S1403. When the confirmation of the additional set information is not completed for part of the firmware information (NO in step S1406), the command execution unit 704 repeats the processing in step S1404 and subsequent steps. On the other hand, when the confirmation of the additional set information is completed for the entire firmware information (YES in step S1406), the processing proceeds to step S1407, In step S1407, the command execution unit 704 determines the firmware of the latest version based on the basic set information stored in the RAM 202 in step S1405.

For example, assume that the firmware illustrated in Table 1 is registered in the software management server 104 and that only Greek is specified in the <addSetName> tag 1305 in the instruction 1300. The command execution unit 704 repeats the processing in steps S1404 to S1406 to store Vers. 100, 200, and 400 in the RAM 202 as information about the basic sets associated with Greek. In step S1407, the command execution unit 704 performs comparison with Vers. 100, 200, and 400 to determine the latest version.

The command execution unit 704 determines the method for determining the firmware version when the result of the determination in step S1404 is "NO", by determining as a setting target the firmware of the latest version from among the information (see Table 1) acquired from the software management server 104. At the present time, the command execution unit 704 determines the firmware of Ver. 400 as a setting target. In this case, the command execution unit 704 does not consider the additional set information.

Methods for determining the latest version depend on the management method to be performed by the software management server 104. Examples of possible methods for determining the latest version includes a method for setting firmware with the largest version number as the latest version, or a method for setting firmware with a latest date of registration in the software management server 104 as the latest version.

[Processing B]

The processing B when "Latest Version" is selected for "Firmware Specification Method" and an additional set is to be added (the value of the <additionalSw> tag 1304 in the instruction 1300 is ON) will be described below with reference to FIG. 14C. Processing details equivalent to those having been described above are assigned the same reference numerals, and redundant descriptions thereof will be omitted.

When the additional set information read from the firmware information acquired from the software management server 104 does not include the additional set information described in the instruction 1300 (NO in step S1404), the processing proceeds to step S1408. In step S1408, the command execution unit 704 deletes the applicable firmware information from the RAM 202. On the other hand, when the additional set information read from the firmware information acquired from the software management server 104 includes the additional set information described in the instruction 1300 (YES in step S1404), the processing proceeds to step S1406.

The command execution unit 704 deletes the firmware information in step S1408 in order to leave only the firmware information to be displayed on the screen 1500 (see FIG. 15) as described below, in the RAM 202. Firmware versions not including the additional sets specified in the instruction 1300 are not displayed on the screen 1500 since these firmware versions are not candidates of installation.

In step S1409, the command execution unit 704 displays the firmware information left in the RAM 202, on the operation unit 208 via the UI control unit 701 of the image forming apparatus 101. An example of a screen displayed at this timing is illustrated in FIG. 15.

In step S1410, the command execution unit 704 determines the first identifier of the basic set and the additional sets of the firmware depending on an input of the operator. By using the first identifiers of the basic set and additional sets determined in this way, the command execution unit 704 downloads the applicable basic and additional sets from the software management server 104 and installs the basic and additional sets. The command execution unit 704 stores the determined firmware information in the RAM 202.

The screen 1500 displayed by the image forming apparatus 101 in step S1409 in the processing B will be described below with reference to FIG. 15.

In a basic set display area 1501, the basic set information for the firmware that has not been deleted from the RAM 202 is displayed in a switchable way.

In an additional set display area 1502, the command execution unit 704 reads the additional set information associated with the basic set selected in the basic set display area 1501, from the RAM 202 and displays the information in a selectable way. In this case, for the additional sets described in the instruction 1300, the command execution unit 704 can change a selected display language to a deselected state, or add a deselected display language as a new additional set. By using the screen 1500, the user can suitably add a new additional set required by the image forming apparatus 101 and then perform the setting processing.

For example, assume that the instruction 1300 is generated when the firmware illustrated in Table 1 is registered in the software management server 104 and that, before the image forming apparatus 101 executes the instruction 1300, new firmware illustrated as a new firmware configuration (see Table 3) is registered in the software management server 104.

TABLE 3

| Basic set | | Additional set | |
|---|---|---|---|
| First identifier | Second identifier | First identifier | Second identifier |
| 5000 | Ver. 500 | 5001 | Greek |
| | | 5002 | Hungarian |
| | | 5003 | Bulgarian |
| | | 5004 | Finnish |
| | | 5005 | Swedish |
| | | 5006 | Estonian |

Additional sets specified in the instruction 1300 are three different languages: Greek, Finnish, and Swedish. Therefore, the firmware versions to be displayed as candidates of installation on the screen 1500 are Vers. 200 and 500 that include the three languages. In Ver. 500, Estonian that has not conventionally been registered in the software management server 104 is added to the additional set display area 1502.

As described above, by specifying "Latest Version" and "Add New Additional Set at Execution", it becomes possible to generate an instruction without waiting for the registration of new firmware, and select new firmware as a setting target in a screen of the image forming apparatus 101. As a result, the user does not need to update the instruction each time new firmware is registered.

Figure 16:
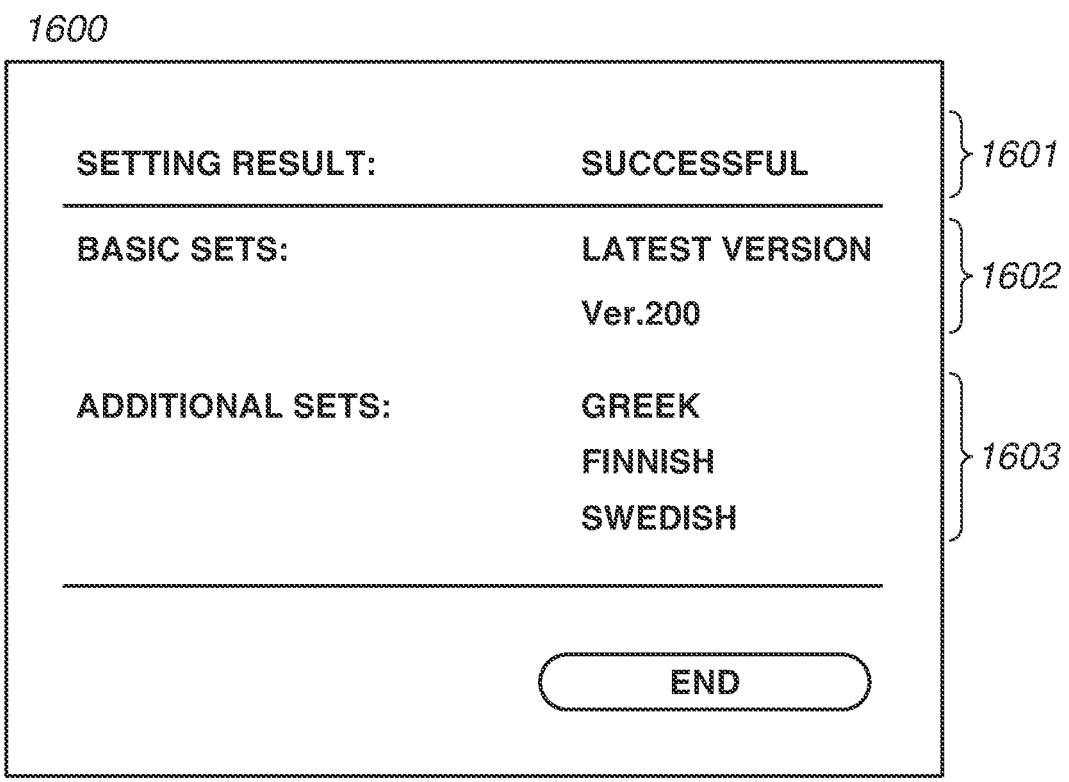
FIG. 16 illustrates an example of a setting ending screen.

FIG. 16 illustrates an example of a setting end screen 1600 displayed on the operation unit 208 of the image forming apparatus 101 upon completion of the setting processing by the image forming apparatus 101. The setting end screen 1600 is automatically displayed on the operation unit 208 of the image forming apparatus 101 at the timing that the setting processing is completed.

The setting end screen 1600 mainly includes an area 1601 for displaying a result, an area 1602 for displaying the basic set information for the firmware, and an area 1603 for displaying the additional set information for the firmware.

According to the present exemplary embodiment, the basic set information and the additional set information are displayed in the setting end screen 1600 only when "Latest Version" is selected for "Firmware Specification Method". When the basic set is specified, i.e., a firmware version is specified, the firmware to be applied to the image forming apparatus 101 has already been identified. In this case, therefore, the firmware does not need to be displayed in the setting end screen 1600. However, even when "Specify Basic Set" is selected for "Firmware Specification Method", the command execution unit 704 may display the basic set information and the additional set information.

On the other hand, when "Latest Version" is selected for "Firmware Specification Method", the user needs to confirm which firmware version has been actually applied when the setting processing has successfully completed. In this case, therefore, the command execution unit 704 displays the basic set information and the additional set information in the setting end screen 1600. If the setting processing fails, in particular, if a firmware installation command fails, the user needs to know which firmware version has been applied when a command failure has occurred. In this case, therefore, the command execution unit 704 displays the basic set information and the additional set information in the setting end screen 1600.

FIG. 17 is a flowchart illustrating a flow of processing executed by the instruction execution program 700 to display the setting end screen 1600.

In step S1701, the processing execution unit 702 determines whether the setting processing of the image forming apparatus 101 is completed. The end of the setting processing refers to the timing that all of commands described in the instruction are executed by the command execution unit 704, the timing that the execution of the instruction is canceled upon detection of an error during execution of a certain command, or the timing that the processing execution unit 702 cancels the execution of the instruction upon reception of a cancel request from the operator via the UI control unit 701. Therefore, the end of the setting processing also includes cases other than where the setting processing in the image forming apparatus 101 has successfully completed.

When the processing execution unit 702 determines that the setting processing is completed (YES in step S1701), the processing proceeds to step S1702. In step S1702, the processing execution unit 702 determines whether "Latest Version" is selected for "Firmware Specification Method" for the executed instruction. On the other hand, when the processing execution unit 702 determines that the setting processing is not completed (NO in step S1701), the processing execution unit 702 waits until the above-described setting processing ends.

In step S1702, the processing execution unit 702 reads information about the instruction stored in the RAM 202 and determines whether "Latest Version" is selected for "Firmware Specification Method". When "Latest Version" is not selected (SPECIFY BASIC SET in step S1702), the processing execution unit 702 ends the processing without displaying the firmware information on the operation unit 208. However, even when "Specify Basic Set" is selected for "Firmware Specification Method", the processing execution unit 702 may display the information about the firmware selected in the basic set information area 805A by the user.

On the other hand, when "Latest Version" is selected for "Firmware Specification Method" (LATEST VERSION in step S1702), the processing proceeds to step S1703. In step S1703, the processing execution unit 702 determines whether the firmware of the latest version has been determined. More specifically, the processing execution unit 702 make the determination, in a case where the command execution unit 704 has already executed a firmware update command during execution of the instruction, depending on whether step S1407 in the processing A or step S1410 in the processing B has been executed, and the determined firmware information is stored in the RAM 202. If the firmware has not been determined (NO in step S1703), the processing proceeds to step S1705. In step S1705, the processing execution unit 702 displays a processing result (interruption or failure) on the operation unit 208 and then ends the processing. In this case, the version information is not displayed on the displayed screen (not illustrated) since the firmware version has not been determined in step S1703.

On the other hand, if the firmware has been determined (YES in step S1703), the processing proceeds to step S1704. In step S1704, the processing execution unit 702 displays the firmware information on the operation unit 208 via the UI control unit 701 and then ends the processing.

As the firmware information, the firmware version is displayed if the version has been determined, regardless of whether the firmware update command has successfully completed or failed.

When executing an instruction for which "Latest Version" is specified, the operator cannot recognize the firmware version and other information at the time of starting the setting processing. Therefore, after identifying the specific firmware version to be applied to the image forming apparatus 101, it is necessary to display the firmware information to inform the operator of the firmware version which has been specifically applied or the firmware version which application has been unsuccessfully attempted when a command failure occurred. The confirmation of the firmware information enables the operator to conduct a study on subsequent measures (particularly when a command failure occurs).

If the setting processing stops or fails before the firmware version is determined, the processing illustrated in FIG. 17 displays a setting end screen (not illustrated) that does not include the version information. On the other hand, when the setting processing stops, fails, or completes after the firmware version is determined, the processing illustrated in FIG. 17 displays the setting end screen 1600 that includes the version information.

<<Setting Processing Instruction>>

As described above, the instruction 1300 describes only the firmware information. However, actually, various commands are written for the installation of applications and the import of setting values of the image forming apparatus 101. FIG. 18 illustrates an example of an instruction 1800 describing information other than the firmware information. Processing details having been described above are assigned the same reference numerals, and redundant descriptions thereof will be omitted.

As illustrated in FIG. 18, the instruction 1800 describes a command 1802 for executing activation processing of optional functions, a command 1803 for executing expansion program installation processing, and a command 1804 for executing import processing of setting data in addition to the commands (the commands 1302 and 1304 and the description areas 1303 and 1305) describing the firmware information.

The command 1802 defines processing for activating the optional functions which are pre-installed in the image forming apparatus 101, by the description of the <activateOptionCommand> tag. The command 1802 includes the <dirpath> and the <name>tags. The <dirpath> tag specifies a directory path including the license file necessary for activating the optional functions. The <name> tag specifies the license file for activating the optional functions. The optional functions are activated when the license in the software management server 104 is used. Although the license file has been described which is required to activate the license, the present disclosure is not limited thereto. For example, a license key defined by a character string may be specified.

The command 1803 defines processing by the description of the <installApplicationCommand> tag. The command 1803 includes the <dirpath> tag and two <name> tags. The <dirpath> tag specifies a directory path as the storage destination of expansion programs to be installed in the software management server 104. The <name> tag specifies the file name and the license file of an application to be installed, Application installation processing is performed by using the application file and the license in the management server 104. Although the processing assumes not only the installation processing but also processing for starting or enabling an application, the processing unit may be divided as required.

The command 1804 defines processing by the description of the <importDeviceConfigCommand> tag. The command 1804 includes the <dirpath> and the <name> tags. The <dirpath> tag specifies the directory path including setting data to be imported within the software management server 104. The <name> tag specifies the file name of the setting data to be imported. The setting data import processing is performed by using the setting data in the software management server 104.

An order of processing is determined by the value of Order described in each command. Although, in the present exemplary embodiment, the instruction 1800 is expressed by using eXtensible Markup Language (XML), the language is not limited to XML. The instruction 1800 may be written in a shell script language.

<<Setting Processing of Image Forming Apparatus 101>>

Processing when the setting processing is performed will be described below with reference to FIG. 19. Processing illustrated in FIG. 19 is executed by the instruction execution program 700 of the image forming apparatus 101. Triggers for executing the processing illustrated in FIG. 19 include the timing that the image forming apparatus 101 is activated and the timing that the acquisition of an instruction is specified via the operation unit 208 of the image forming apparatus 101.

The processing illustrated in FIG. 19 is performed on the premise that the instruction 1800 generated by the information processing apparatus 102 is prestored in the instruction management server 103.

In step S1901, the communication unit 707 of the instruction execution program 700 acquires the stored instruction 1800. In step S1902, the instruction analysis unit 703 of the instruction execution program 700 analyzes the acquired instruction.

In step S1903, according to an analysis result of the instruction 1800, the processing execution unit 702 of the instruction execution program 700 executes processing. As described above, the order of processing is determined by the execution order determination unit 705 based on the value of Order described in each command. The flowcharts illustrated in FIGS. 14A to 14C are equivalent to parts of the processing in step S1903 after completion of the analysis processing in step S1902.

In step S1904, the execution result generation unit 706 generates a result of the setting processing, and the instruction execution program 700 transmits the result to the instruction management server 103 via the communication unit 707. This completes descriptions of the setting processing performed by the image forming apparatus 101.

In this way, a normal instruction executes the setting processing according to commands described in the instruction. However, the instruction according to the present application does not describe specific information about the firmware to be set to the image forming apparatus 101 but describes only information for identifying the firmware. The use of the information enables identifying of the firmware of the latest version at the timing that the setting processing is performed by the image forming apparatus 101.

The above-described exemplary embodiment makes it possible to set the firmware of the latest version at the timing that the image forming apparatus 101 performs the setting processing, even if the firmware of the latest version to be set to the image forming apparatus 101 has not been determined at the time of generating an instruction. This eliminates the need of updating the instruction each time the firmware of the latest version is released without bothering the user.

Other Embodiments

In the above-described exemplary embodiment, a screen for selecting the optional functions to be set to the image forming apparatus 101 is displayed when the "Specify Software" tab in the page selection tab area 801 is selected. However, the present disclosure is not limited thereto. As described above, the functions assumed as additional sets may be the optional functions of the image forming apparatus 101. Further, the user may be prompted to select the optional functions implementable using the "Specify Software" tab as additional sets.

Although, in the above-described exemplary embodiment, a plurality of additional sets is associated with each firmware version, no additional set may be associated with a certain firmware version. In this case, additional sets are not displayed in the additional set information area 806A. Additional sets are displayed in the additional set information area 806A only when at least one additional set is associated with the firmware.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s), The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (MID), or Blu-ray Disc (BD)™) a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-008714, filed Jan. 22, 2019, which is hereby incorporated by reference herein in its entirety.

What is claimed is:

1. An image forming apparatus communicating with an instruction management apparatus; and a firmware management system,
wherein the firmware management system manages plural firmware sets, respectively including a combination of different version number information of firmware and resource information related to display languages on the image forming apparatus,
the image forming apparatus comprising:
a memory that stores an instruction execution program, and
a processor that executes the instruction execution program to perform:
analyzing an instruction received from the instruction management apparatus;
in a case where the analyzed instruction describes that a latest version without a version number of the firmware is specified as the firmware to be installed in the image forming apparatus, acquiring, from the firmware management system, information about plural firmware sets applicable to the image forming apparatus;
recording one or more firmware sets having resource information indicating that display languages described in the analyzed instruction are included;
determining a firmware set having version number information indicating a version number of the latest version from among the recorded one or more firmware sets; and
setting, based on the determined firmware set, firmware and resources to the image forming apparatus.

2. The image forming apparatus according to claim 1, wherein the image forming apparatus further displays a result of an installation of the acquired firmware.

3. The image forming apparatus according to claim 1, wherein the processor executes the instruction execution program to further perform displaying information of the determined firmware set on the image forming apparatus.

4. A method performed by an image forming apparatus communicating with an instruction management apparatus and a firmware management system, wherein the firmware management system manages plural firmware sets, respectively including a combination of different version number information of firmware and resource information related to display languages on the image forming apparatus, the method comprising:
analyzing an instruction received from the instruction management apparatus;
in a case where the analyzed instruction describes that a latest version without a version number of the firmware is specified as the firmware to be installed in the image forming apparatus, acquiring, from the firmware management system, information about plural firmware sets applicable to the image forming apparatus;
recording one or more firmware sets having resource information indicating that display languages described in the analyzed instruction are included;
determining a firmware set having version number information indicating a version number of the latest version from among the recorded one or more firmware sets; and
setting, based on the determined firmware set, firmware and resources to the image forming apparatus.

* * * * *